(12) United States Patent
Chang et al.

(10) Patent No.: US 12,235,509 B2
(45) Date of Patent: *Feb. 25, 2025

(54) IMAGING LENS SYSTEM, CAMERA MODULE AND ELECTRONIC DEVICE

(71) Applicant: LARGAN PRECISION CO., LTD., Taichung (TW)

(72) Inventors: Lin An Chang, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/378,456

(22) Filed: Oct. 10, 2023

(65) Prior Publication Data

US 2024/0036287 A1    Feb. 1, 2024

Related U.S. Application Data

(63) Continuation of application No. 16/838,846, filed on Apr. 2, 2020, now Pat. No. 11,815,731.

(30) Foreign Application Priority Data

Feb. 12, 2020    (TW) ................ 109104387

(51) Int. Cl.
*G02B 7/02* (2021.01)
*G02B 13/00* (2006.01)
(Continued)

(52) U.S. Cl.
CPC ............. *G02B 7/021* (2013.01); *G02B 7/022* (2013.01); *G02B 13/002* (2013.01);
(Continued)

(58) Field of Classification Search
CPC ...... G02B 7/021; G02B 7/022; G02B 13/002; G02B 13/0045; G03B 17/12; G03B 30/00; H04N 23/55
(Continued)

(56) References Cited

U.S. PATENT DOCUMENTS 7,419,315 B2    9/2008    Hirata et al.
8,465,273 B2    6/2013    Lai
(Continued)

FOREIGN PATENT DOCUMENTS

CN    103809261 A    5/2014
CN    110716275 A    1/2020
(Continued)

OTHER PUBLICATIONS

IN Hearing Notice dated Dec. 26, 2023 as received in Application No. 202034029860.
(Continued)

*Primary Examiner* — Mahidere S Sahle
(74) *Attorney, Agent, or Firm* — Maschoff Brennan

(57) ABSTRACT

An imaging lens system has an optical axis and includes a plastic lens barrel and an imaging lens assembly disposed in the plastic lens barrel. The plastic lens barrel surrounds the optical axis and includes an object-side surface, an image-side surface, an inner annular portion and an outer annular portion. The object-side and image-side surfaces are oppositely disposed and substantially perpendicular to the optical axis. The inner and outer annular portions are connected to the object-side and image-side surfaces. The inner annular portion has an inner parallel annular surface, and the outer annular portion has a first outer annular surface and a gate trace. The imaging lens assembly includes a plurality of imaging lens elements. One of the imaging lens elements has an outer diameter larger than $\pi^2$ millimeters. The one of the
(Continued)

imaging lens elements has an outer edge in physical contact with the inner parallel annular surface.

10 Claims, 30 Drawing Sheets

(51) Int. Cl.
   *H04N 23/55* (2023.01)
   *G03B 17/12* (2021.01)
   *G03B 30/00* (2021.01)

(52) U.S. Cl.
   CPC ......... *G02B 13/0045* (2013.01); *H04N 23/55* (2023.01); *G03B 17/12* (2013.01); *G03B 30/00* (2021.01)

(58) Field of Classification Search
   USPC .................................................. 359/819–830
   See application file for complete search history.

(56) References Cited

U.S. PATENT DOCUMENTS

| | | |
|---|---|---|
| 9,019,637 B2 | 4/2015 | Tsai |
| 9,946,047 B2 | 4/2018 | Lin et al. |
| 10,027,865 B1 | 7/2018 | Tsai et al. |
| 2014/0133040 A1 | 5/2014 | Tsai |
| 2017/0075109 A1 | 3/2017 | Chou et al. |
| 2017/0131513 A1 | 5/2017 | Lin et al. |
| 2017/0322394 A1 | 11/2017 | Chou et al. |

FOREIGN PATENT DOCUMENTS

| | | |
|---|---|---|
| JP | 3459128 B2 | 10/2003 |
| JP | 6499608 B2 | 4/2019 |

OTHER PUBLICATIONS

IN Patent Examination Report dated Sep. 10, 2021 as received in Application No. 202034029860.

IMAGING LENS SYSTEM, CAMERA MODULE AND ELECTRONIC DEVICE

RELATED APPLICATIONS

This application is a continuation patent application of U.S. application Ser. No. 16/838,846, filed on Apr. 2, 2020, which claims priority to Taiwan Application 109104387, filed on Feb. 12, 2020, which is incorporated by reference herein in its entirety.

BACKGROUND

Technical Field

The present disclosure relates to an imaging lens system, a camera module and an electronic device, more particularly to an imaging lens system and a camera module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

A conventional optical lens system usually includes an injection molded plastic lens barrel, which not only reduces manufacturing costs, but also increases shape design flexibility of the inner side surface of the lens barrel to meet various requirements. However, in the process of injection molding, there may be some problems existing in manufacturing the plastic lens barrel such as insufficient roundness on the assembling structure of the inner side surface of the plastic lens barrel, insufficient flatness on the object-side surface or the image-side surface, insufficient coaxiality on the assembled geometric structure, and insufficient overall structural strength due to a poor melt flow rate and a low holding pressure of the injection molded plastic material caused by manufacturing environment factors. Accordingly, how to improve the structure of the injection molded plastic lens barrel is an important topic in the field nowadays.

SUMMARY

According to one aspect of the present disclosure, an imaging lens system has an optical axis and includes a plastic lens barrel and an imaging lens assembly.

The plastic lens barrel surrounds the optical axis and includes an object-side surface, an image-side surface, an inner annular portion and an outer annular portion.

The object-side surface is substantially perpendicular to the optical axis. The image-side surface is substantially perpendicular to the optical axis and is disposed opposite to the object-side surface.

The inner annular portion is connected to the object-side surface and the image-side surface, and the inner annular portion has at least one inner parallel annular surface. The outer annular portion is connected to the object-side surface and the image-side surface, the outer annular portion is located farther away from the optical axis than the inner annular portion, and the outer annular portion has a first outer annular surface and at least three gate traces.

The imaging lens assembly is disposed in the plastic lens barrel and includes a plurality of imaging lens elements. One of the plurality of imaging lens elements has an outer diameter larger than $\pi^2$ millimeters, the one of the plurality of imaging lens elements has an outer edge in physical contact with the at least one inner parallel annular surface of the inner annular portion, and $\pi$ is pi.

The first outer annular surface, the at least three gate traces and the at least one inner parallel annular surface are respectively disposed in order from an object side to an image side. The first outer annular surface is tapered off towards the object-side surface.

When an angle between the first outer annular surface and the optical axis is $\alpha$, the following condition is satisfied:

$$5 \text{ [deg.]} \leq \alpha \leq 65 \text{ [deg.]}.$$

According to another aspect of the present disclosure, an imaging lens system has an optical axis and includes a plastic lens barrel and an imaging lens assembly.

The plastic lens barrel surrounds the optical axis and includes an object-side surface, an image-side surface, an inner annular portion and an outer annular portion.

The object-side surface is substantially perpendicular to the optical axis. The image-side surface is substantially perpendicular to the optical axis and is disposed opposite to the object-side surface.

The inner annular portion is connected to the object-side surface and the image-side surface, and the inner annular portion has at least one inner parallel annular surface. The outer annular portion is connected to the object-side surface and the image-side surface, the outer annular portion is located farther away from the optical axis than the inner annular portion, and the outer annular portion has a first outer annular surface and at least three gate traces.

The imaging lens assembly is disposed in the plastic lens barrel and includes a plurality of imaging lens elements. One of the plurality of imaging lens elements has an outer diameter larger than $\pi^2$ millimeters, the one of the plurality of imaging lens elements has an outer edge in physical contact with the at least one inner parallel annular surface of the inner annular portion, and $\pi$ is pi.

The first outer annular surface is located closer to the object-side surface than the at least three gate traces, and the first outer annular surface is tapered off towards the object-side surface.

When a distance in parallel with the optical axis between the at least three gate traces and the object-side surface of the plastic lens barrel is Lg, and a distance in parallel with the optical axis between the image-side surface and the object-side surface of the plastic lens barrel is Lb, the following condition is satisfied:

$$0.2 < Lg/Lb < 0.92.$$

According to another aspect of the present disclosure, a camera module includes one of the aforementioned imaging lens systems and an image sensor, wherein the image sensor is disposed on an image surface of the imaging lens system.

According to another aspect of the present disclosure, an electronic device includes the aforementioned camera module.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
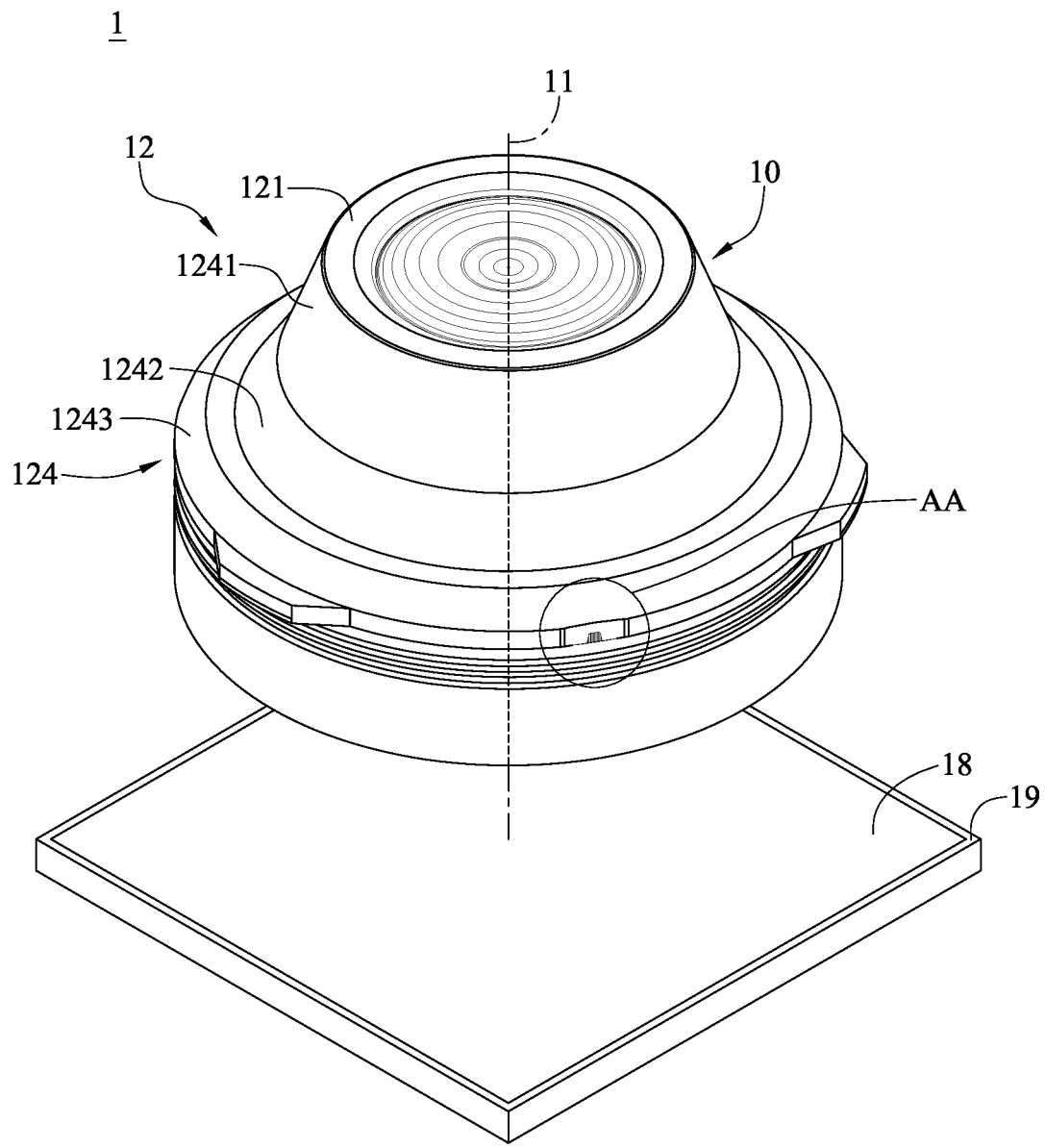
FIG. 1 is a perspective view of a camera module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an imaging lens system having an optical axis and including a plastic lens barrel and an imaging lens assembly. The plastic lens barrel is applicable to a high optical resolution lens assembly, and the imaging lens assembly is disposed in the plastic lens barrel. The plastic lens barrel can be made of black plastic material by injection molding. Therefore, it is favorable for reducing light reflection in the plastic lens barrel and manufacturing cost thereof. The plastic lens barrel can be a non-threaded lens barrel. Therefore, such a non-threaded structure is favorable for simplifying the design of the injection mold so as to increase manufacturing efficiency. Moreover, the plastic lens barrel can be fixed in a lens carrier by adhesives or by engaging structures.

The plastic lens barrel surrounds the optical axis and includes an object-side surface, an image-side surface, an inner annular portion and an outer annular portion. The object-side surface is substantially perpendicular to the optical axis. The image-side surface is substantially perpendicular to the optical axis and is disposed opposite to the object-side surface. The object-side surface can have a maximum outer diameter smaller than that of the image-side surface. Therefore, it is favorable for providing the feasibility of compactness of the imaging lens system and for further increasing the structural strength of the plastic lens barrel at the object-side surface and the image-side surface.

The inner annular portion is connected to the object-side surface and the image-side surface, the inner annular portion has at least one inner parallel annular surface, and the inner annular portion can further have a tip-end aperture. Moreover, the number of the inner parallel annular surface can be at least six. Therefore, it is favorable for making the overall thickness of the wall of the plastic lens barrel to be uniform so as to increase consistency of the plastic material flow in the injecting process of injection molding.

The at least one inner parallel annular surface can have a diameter larger than $\pi^2$ mm (millimeters), wherein $\pi$ is pi (a mathematical constant equal to a circle's circumference divided by its diameter). Therefore, it is favorable for effectively reducing the possibility of generating stray light. The tip-end aperture is configured for light entering the imaging lens assembly, and the tip-end aperture can be located closer to the object-side surface than the inner parallel annular surface.

The outer annular portion is connected to the object-side surface and the image-side surface, the outer annular portion is located farther away from the optical axis than the inner annular portion, and the outer annular portion has a first outer annular surface and at least three gate traces. The first outer annular surface can be located closer to the object-side surface than the gate traces. Moreover, the first outer annular surface, the gate traces and the at least one inner parallel annular surface are respectively disposed in order from an object side to an image side.

The first outer annular surface is tapered off towards the object-side surface. Therefore, it is favorable for preventing the interference between the plastic lens barrel and the injection mold. Moreover, the first outer annular surface can be a truncated conical surface and can be tapered. Therefore, it is favorable for reducing the demolding resistance after injection molding the plastic lens barrel so as to increase quality stability of the plastic lens barrel in the manufacturing process of injection molding, and it is also favorable for increasing the melt flow rate of plastic material in the injecting process so as to make the surface structure of the plastic lens barrel on the object-side surface to be more complete, thereby increasing the manufacturing yield of injection molding. Moreover, the tapered degree of the first outer annular surface can be more inclined than the draft angle required for demolding from the injection mold. Therefore, it is favorable for obtaining a better melt flow rate of plastic material in the injecting process so as to increase the productivity rate and productive capacity.

Figure 8:
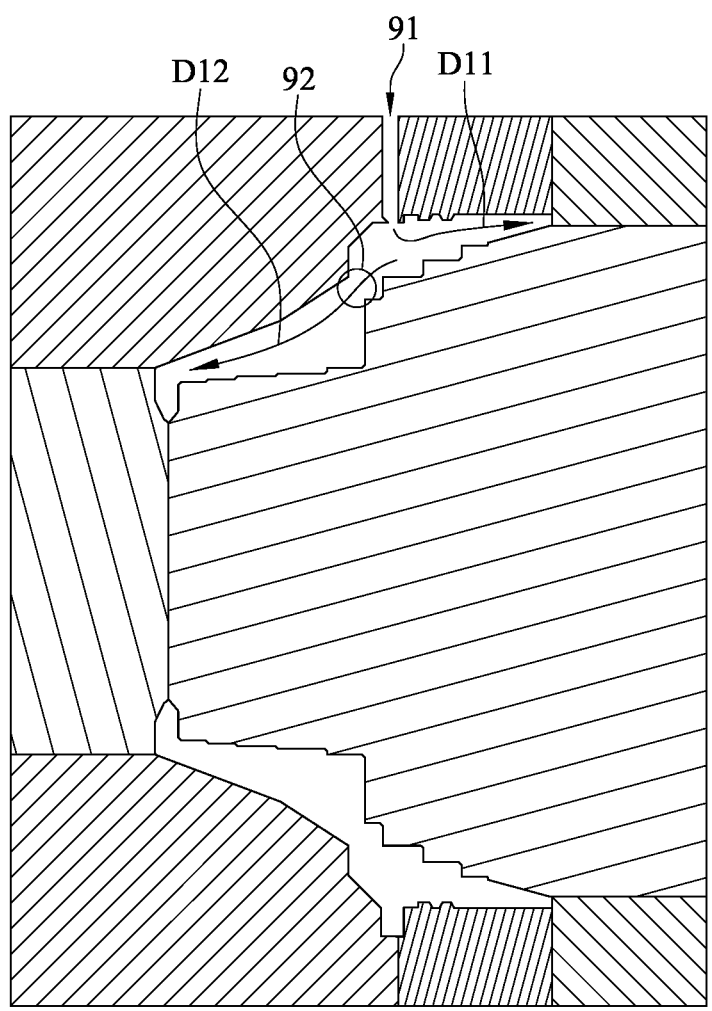
FIG. 8 is a schematic view of the injection mold configured for forming the plastic lens barrel of the camera module in FIG. 1 therein.
Figure 9:
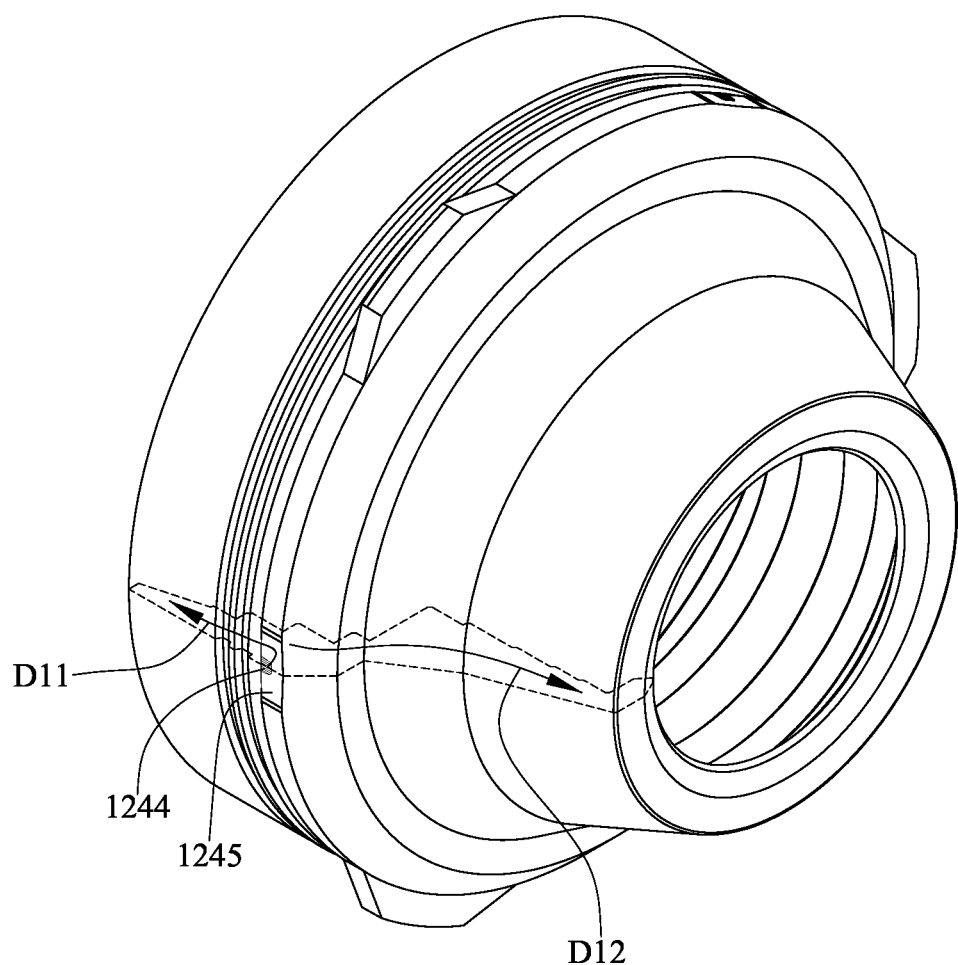
FIG. 9 is a perspective view of showing the plastic material flow direction during the formation of the plastic lens barrel of the camera module in FIG. 1 by injection molding.
Figure 10:
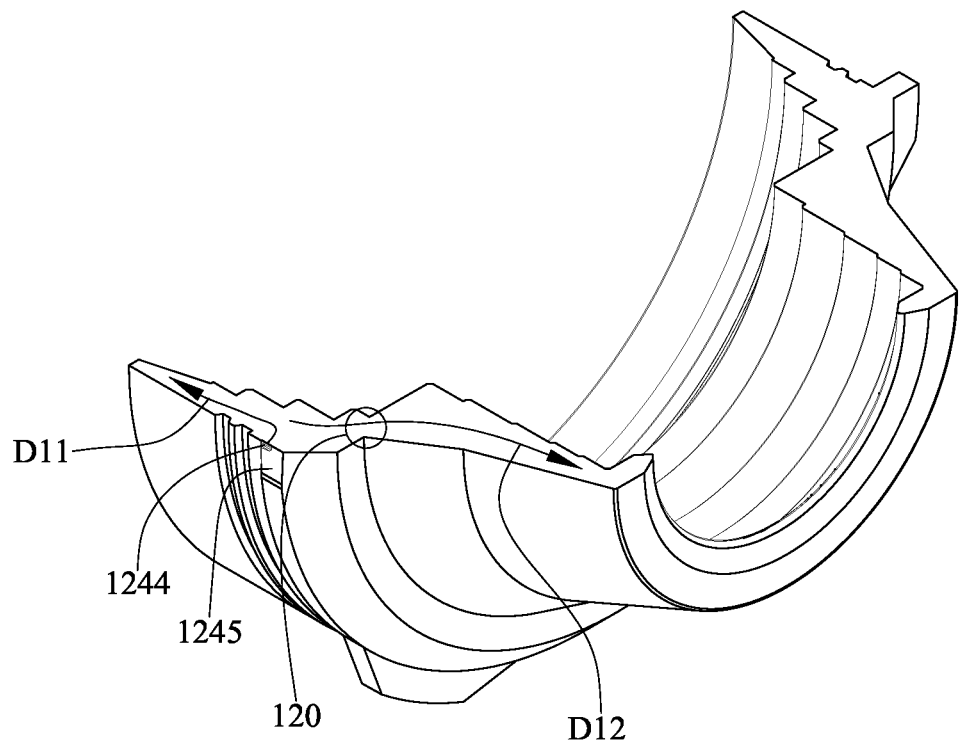
FIG. 10 is a perspective view of the sectioned plastic lens barrel in FIG. 9 for showing the plastic material flow direction during the formation.
Figure 23:
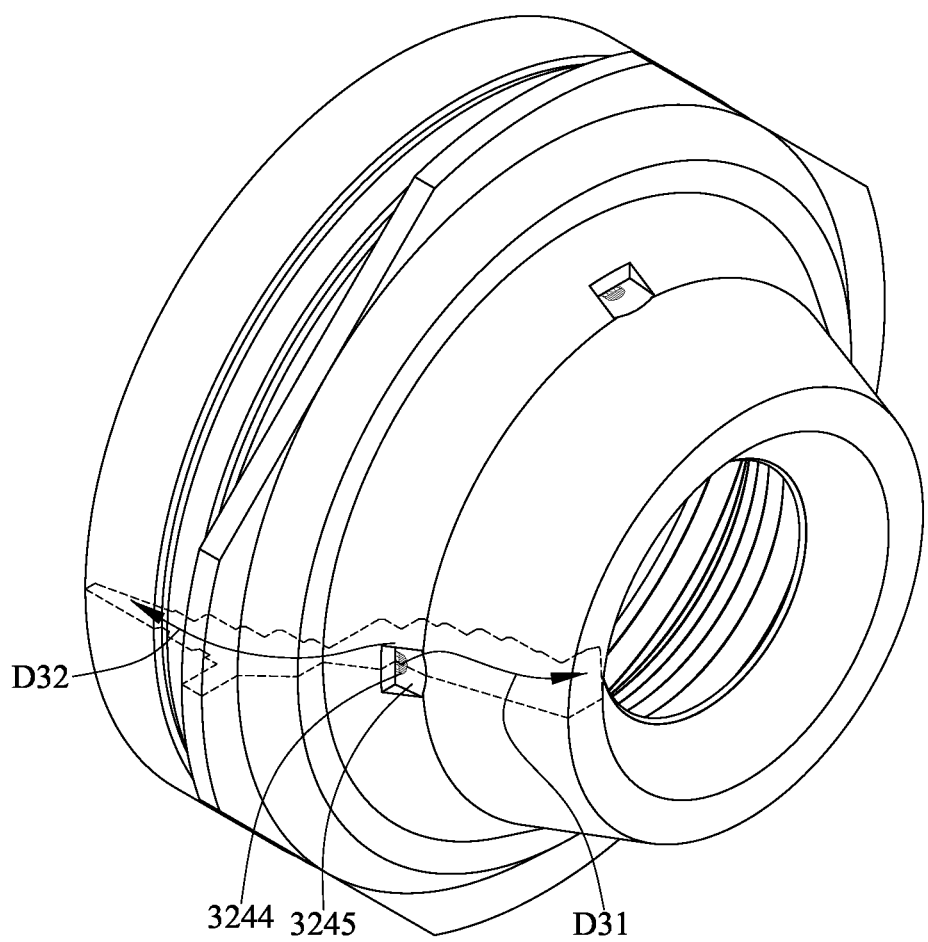
FIG. 23 is a perspective view of showing the plastic material flow direction during the formation of the plastic lens barrel of the camera module in FIG. 18 by injection molding.
Figure 24:
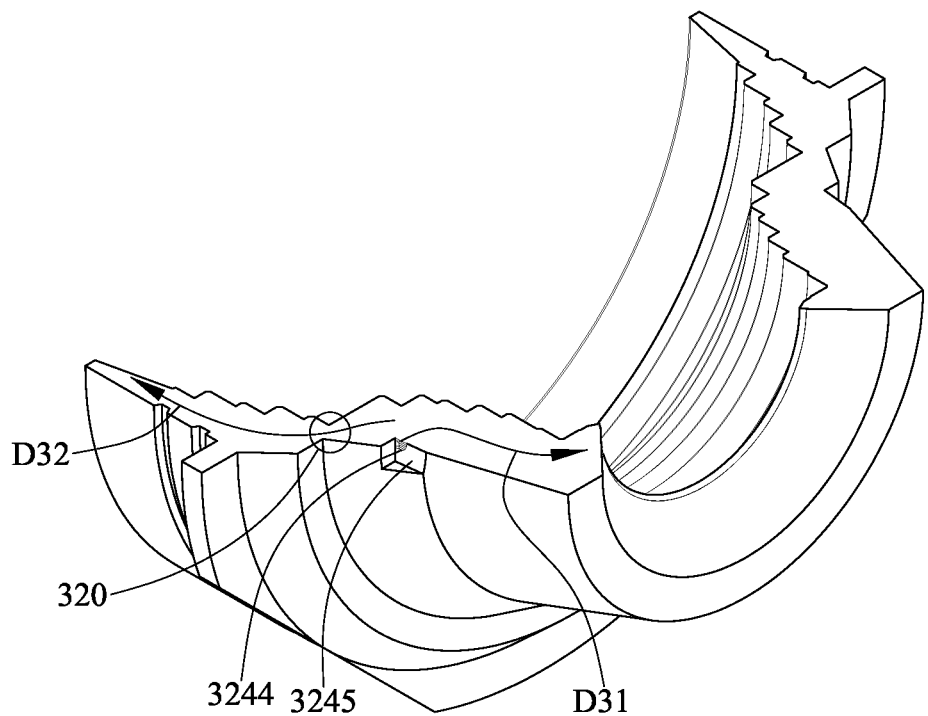
FIG. 24 is a perspective view of the sectioned plastic lens barrel in FIG. 23 for showing the plastic material flow direction during the formation.

The gate traces are generated correspondingly to the centrally designed gates in the injecting process. Therefore, it is favorable for increasing the filling pressure of the plastic material in the inner annular portion in the injecting process so as to increase the roundness of the inner parallel annular surface, thereby reducing misaligned assembly and increasing coaxiality. Please refer to FIG. 8 to FIG. 10, which show schematic views of forming the gate traces 1244 according to the 1st embodiment of the present disclosure, and the arrows D11 and D12 indicate the flow directions of plastic material during injection molding. As shown in FIG. 8 to FIG. 10, in the injecting process, the plastic material is first filled towards the image-side surface 122 (e.g., the direction of the arrow D11), and then the plastic material is filled towards the object-side surface 121 (e.g., the direction of the arrow D12) along the first outer annular surface 1241. In addition, as shown in FIG. 10, there can be a narrowed runner 92 disposed on the way to the object-side surface 121 (e.g., the direction of the arrow D12) to make the plastic material flow rate and direction more stable. Accordingly, the area close to the image-side surface will be filled with plastic material first so as to make the plastic material more uniform and stable in the pressure-holding process of the injection molding, thereby obtaining better roundness of the inner parallel annular surface close to the image-side surface and preventing eccentricity of the assembled lens element; however, the present disclosure is not limited thereto. Please refer to FIG. 23 to FIG. 24, which show schematic views of forming the gate traces 3244 according to the 3rd embodiment of the present disclosure, and the arrows D31 and D32 indicate the flow directions of plastic material during injection molding. As shown in FIG. 23 to FIG. 24, in the injection process, the plastic material can also be first filled towards the object-side surface 321 (e.g., the direction of the arrow D31), then the plastic material can be filled towards the image-side surface 322 (e.g., the direction of the arrow D32), and a narrowed runner can be disposed on the way to the image-side surface 322.

The appearance of each of the gate traces can be a quadrilateral, trapezoid, semi-circle, oval, ellipse or circle. Please refer to FIG. 4, which shows a schematic view of the appearance of the gate trace 1244 according to the 1st embodiment of the present disclosure; in this embodiment, the appearance of the gate trace 1244 is a trapezoid, but the present disclosure is not limited thereto. Please refer to FIG. 19, which shows a schematic view of the appearance of the gate trace 3244 according to the 3rd embodiment of the present disclosure; in this embodiment, the appearance of the gate trace 3244 is a semi-oval.

The surface properties of the gate traces can be different from that of the peripheral areas thereof. Moreover, each of the gate traces can include a cutting trace area and an injection defect area, and the surface appearances of the cutting trace area and the injection defect area are distinct from that of the peripheral areas thereof. Note that the injection defect areas are easily generated on the gate traces if the heat of the injected plastic material has not completely dissipated in the demolding process. In contrast, the present disclosure provides fast and stable injection quality; although a higher temperature in the demolding process leads to a higher possibility to generate the injection defect areas on the gate traces, this is considered a normal situation which does not affect the dimensional precision and can reduce molding time and increase manufacturing efficiency.

The gate traces can be axisymmetric to the optical axis. Therefore, it is favorable for increasing the uniformity of the plastic lens barrel so as to balance the stress distribution of the plastic material, thereby stabilizing the center of gravity of the imaging lens system. Please refer to FIG. 5, which shows a schematic view of the positions of the gate traces 1244 according to the 1st embodiment of the present disclosure; in this embodiment, the number of the gate traces 1244 is three, and the gate traces 1244 are axisymmetric to the optical axis 11, but the present disclosure is not limited thereto. Please refer to FIG. 13, which shows a schematic view of the positions of the gate traces 2244 according to the 2nd embodiment of the present disclosure; in this embodiment, the number of the gate traces 2244 is four, and the gate traces 2244 are axisymmetric to the optical axis 21. Moreover, the outer annular portion can further have at least three planes, and the at least three gate traces are respectively disposed on the at least three planes. Therefore, it is favorable for preventing interference between the peripheries of the gate traces and external components.

The imaging lens assembly includes a plurality of imaging lens elements. Moreover, the number of the imaging lens elements can be at least six. Therefore, it is favorable for providing an optical imaging system with high optical quality.

One of the imaging lens elements has an outer diameter larger than $\pi^2$ mm. Therefore, it is favorable for mounting a larger lens element in a limited space of the imaging lens assembly so as to more efficiently correct aberrations and provide the imaging lens system with high resolution. Moreover, the outer diameter of the imaging lens element closest to the image side can be larger than $\pi^2$ mm. Moreover, the outer diameter of each of the two imaging lens elements closest to the image side can be larger than $\pi^2$ mm.

One of the imaging lens elements has an outer edge in physical contact with the inner parallel annular surface of the inner annular portion. Moreover, the inner parallel annular surface and the one of the imaging lens elements are partially fitted with each other. Therefore, it is favorable for having good coaxiality of the imaging lens assembly by mounting the one of the imaging lens elements to the inner parallel annular surface with high-precision of the plastic lens barrel fitted with each other so as to provide optical quality with high optical resolution. Moreover, the inner parallel annular surface and one of the imaging lens elements can have the same diameter at peripheries thereof and can be coaxially assembled with each other. Therefore, it is favorable for ensuring the coaxiality between the one of the imaging lens elements with large diameter and the plastic lens barrel so as to prevent deformation of the one of the imaging lens elements with large diameter while being assembled, thereby ensuring imaging quality in high resolution.

Both of the mold shrinkage of the plastic lens barrel and the mold shrinkage of one of the imaging lens element can be smaller than 0.7%, wherein the mold shrinkage can be defined by the following formula: (mold size−size of molded component)÷mold size×100%. Therefore, it is favorable for increasing manufacturing precision due to the structure design of low deformation, such that the plastic lens barrel and the one of the imaging lens elements can be fitter in size, but the mold shrinkage is not limited to this value. Moreover, the manufacturing tolerances of the one of the imaging lens elements and the inner parallel annular surface of the plastic lens barrel can be controlled within the range of 2 μm.

The plastic lens barrel can be made of applicable materials such as polycarbonate (PC), polyamide (PA) and liquid crystal polymer (LCP), and the imaging lens elements can be made of applicable materials such as polycarbonate (PC) and cyclic olefin polymer (COP). Therefore, it is favorable for reducing the dimensional difference between the molded components in the molding process. However, the applicable materials are not limited thereto and can also be mixed materials or doped with glass fiber.

When an angle between the first outer annular surface and the optical axis is α, the following condition can be satisfied: 5 [deg.]≤α≤65 [deg.]. Therefore, it is favorable for increasing the melt flow rate of the plastic material in the injecting process so as to increase the flatness of the object-side surface. Moreover, the following condition can also be satisfied: 15 [deg.]≤α≤55 [deg.]. Therefore, it is favorable for further increasing the melt flow rate of the plastic material, such that the overall structure on the object side is more complete. Please refer to FIG. 7, which shows a schematic view of the angle α between the first outer annular surface 1241 and the optical axis 11 according to the 1st embodiment of the present disclosure.

When a distance in parallel with the optical axis between the gate traces and the object-side surface of the plastic lens barrel is Lg, and a distance in parallel with the optical axis between the image-side surface and the object-side surface of the plastic lens barrel is Lb, the following condition can be satisfied: 0.2<Lg/Lb<0.92. Therefore, it is favorable for making the plastic material more uniform and stable in the pressure-holding process, thereby ensuring the overall structural strength and roundness of the plastic lens barrel. Moreover, the following condition can also be satisfied: 0.33<Lg/Lb<0.85. Therefore, it is favorable for further ensuring both of the overall structural strength and roundness of the plastic lens barrel. Moreover, the following condition can also be satisfied: 0.5≤Lg/Lb≤0.75. Therefore, it is favorable for centrally designing the gates in the area close to the image side so as to stabilize the streamline of the plastic material on the inner parallel annular surface of the plastic lens barrel in molding process and to prevent warpage due to residual stress in the plastic material after the demolding process. Please refer to FIG. 7, which shows a schematic view of the distance Lg in parallel with the optical axis 11 between the gate traces 1244 and the object-side surface 121 of the plastic lens barrel 12 and the distance Lb in parallel with the optical axis 11 between the image-side surface 122 and the object-side surface 121 of the plastic lens barrel 12.

When the distance in parallel with the optical axis between the image-side surface and the object-side surface of the plastic lens barrel is Lb, the following condition can be satisfied: 5 [mm]<Lb<15 [mm]. Therefore, it is favorable for providing a proper accommodating space for the imaging lens assembly with high optical specifications so as to be better collaborated with an image sensor with high pixel.

The present disclosure provides a camera module including the aforementioned imaging lens system and an image sensor, wherein the image sensor is disposed on an image surface of the imaging lens system. The camera module can further includes a driving module. Therefore, it is favorable for achieving autofocus and optical image stabilization.

The present disclosure provides an electronic device including the aforementioned camera module.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
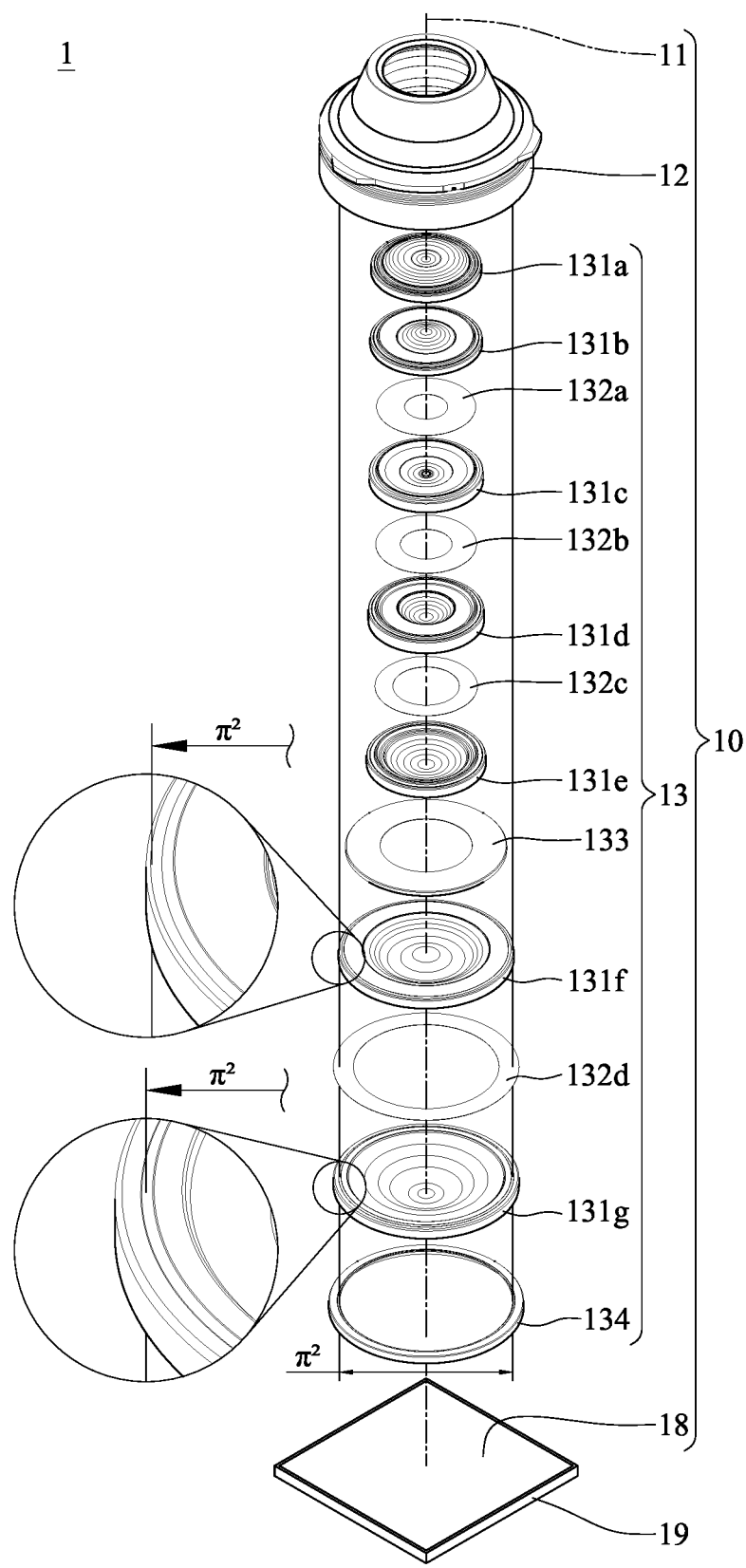
FIG. 2 is an exploded view of the camera module in FIG. 1.
Figure 3:
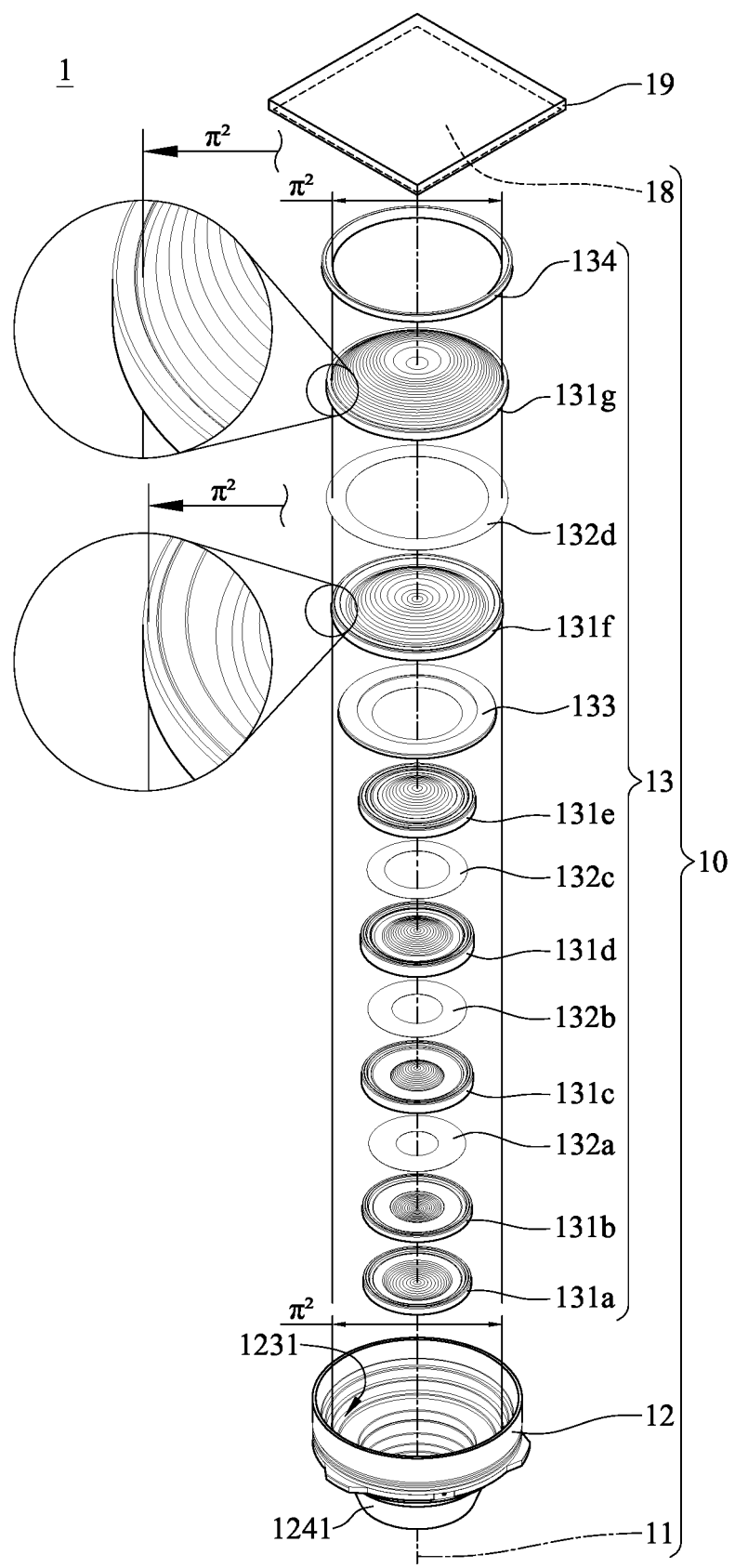
FIG. 3 is another exploded view of the camera module in FIG. 1.
Figure 4:
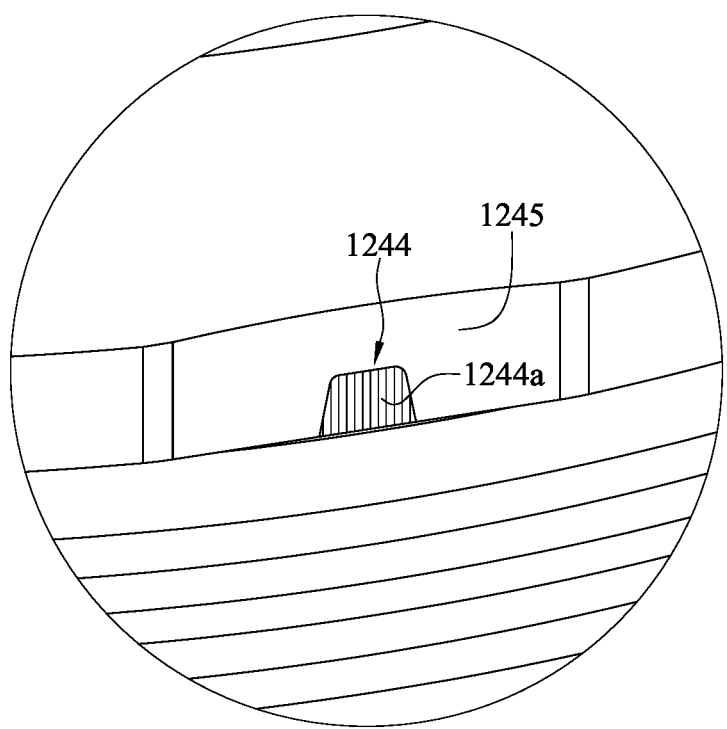
FIG. 4 is an enlarged view of the AA region of the camera module in FIG. 1.
Figure 5:
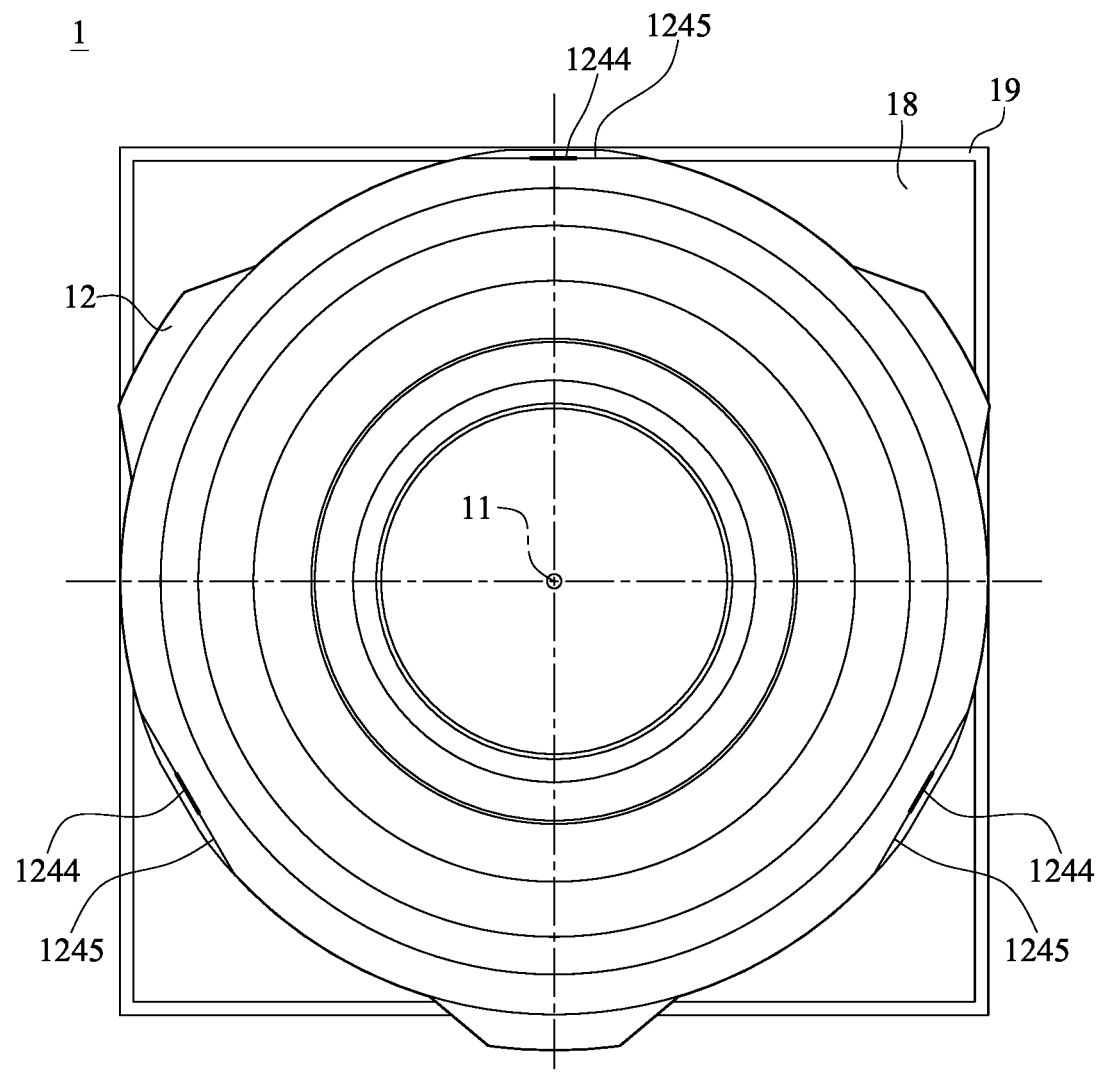
FIG. 5 is a top view of the camera module in FIG. 1.
Figure 6:
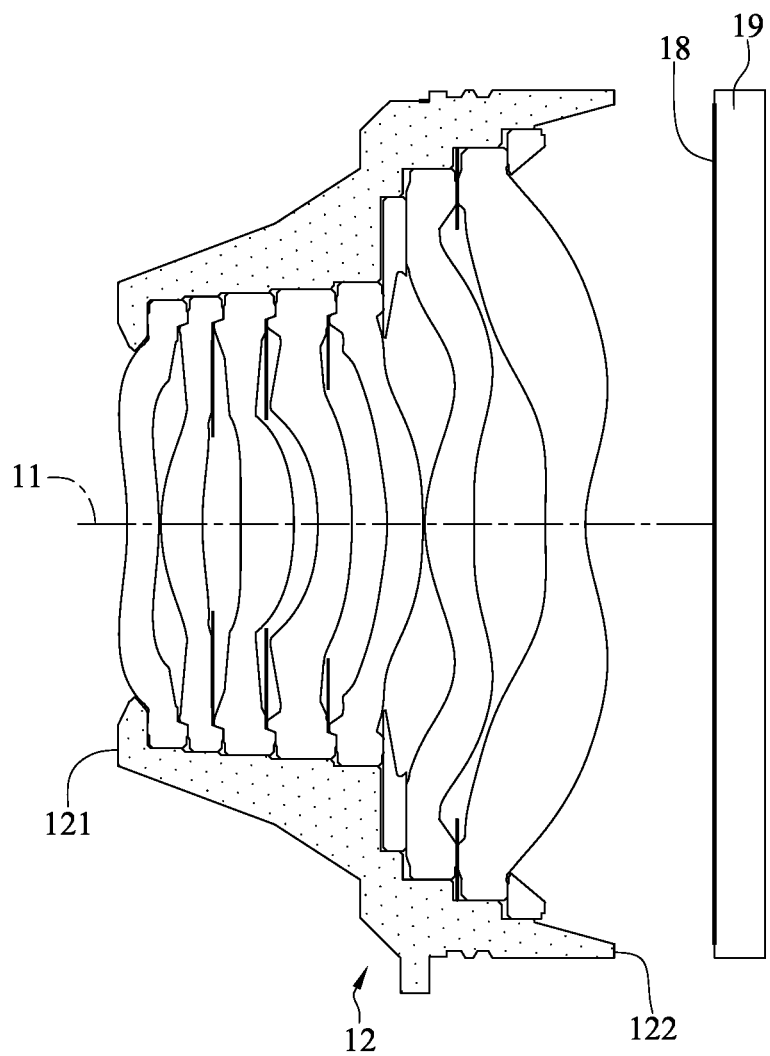
FIG. 6 is a cross-sectional view of the camera module in FIG. 1.
Figure 7:
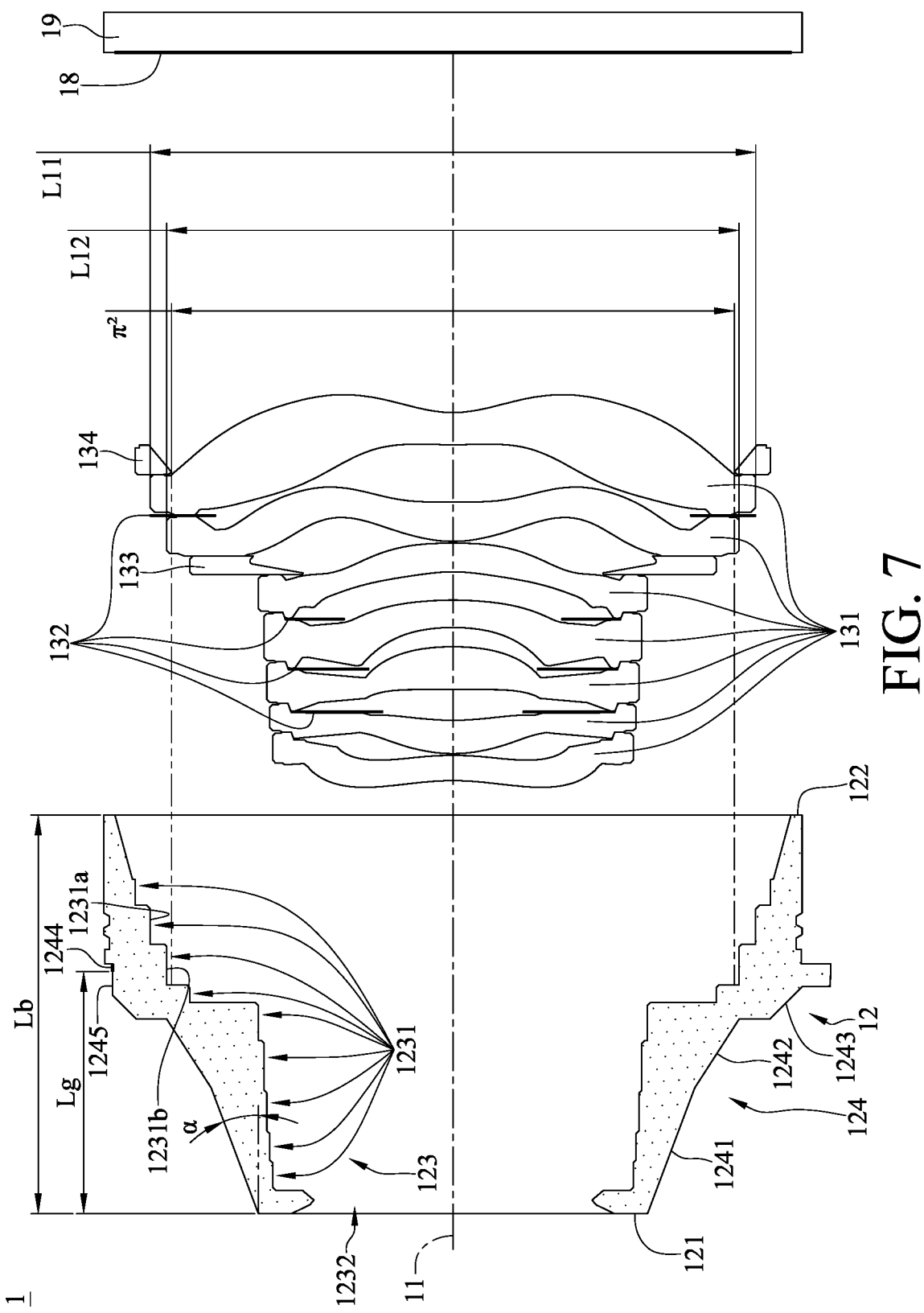
FIG. 7 is an exploded view of the camera module in FIG. 6.

Please refer to FIG. 1 to FIG. 10, where FIG. 1 is a perspective view of a camera module according to the 1st embodiment of the present disclosure, FIG. 2 is an exploded view of the camera module in FIG. 1, FIG. 3 is another exploded view of the camera module in FIG. 1, FIG. 4 is an enlarged view of the AA region of the camera module in FIG. 1, FIG. 5 is a top view of the camera module in FIG. 1, FIG. 6 is a cross-sectional view of the camera module in FIG. 1, FIG. 7 is an exploded view of the camera module in FIG. 6, FIG. 8 is a schematic view of the injection mold configured for forming the plastic lens barrel of the camera module in FIG. 1 therein, FIG. 9 is a perspective view of showing the plastic material flow direction during the formation of the plastic lens barrel of the camera module in FIG. 1 by injection molding, and FIG. 10 is a perspective view of the sectioned plastic lens barrel in FIG. 9 for showing the plastic material flow direction during the formation.

In this embodiment, a camera module 1 includes an imaging lens system 10 and an image sensor 19. The imaging lens system 10 has an optical axis 11 and an image surface 18, and the image sensor 19 is disposed on the image surface 18. The imaging lens system 10 includes a plastic lens barrel 12 and an imaging lens assembly 13. The plastic lens barrel 12 and the imaging lens assembly 13 both are located on an object-side direction of the image sensor 19, and the imaging lens assembly 13 is disposed in the plastic lens barrel 12.

The plastic lens barrel 12 is a non-threaded lens barrel made of black plastic material by injection molding and is fixed in a lens carrier (not shown) of the camera module 1 by adhesives. In the injecting process of the injection molding, the plastic material is fed into an injection mold 9 via gates 91 of the injection mold 9, and the plastic material is first filled towards an image side along the direction of an arrow D11, and then filled towards an object side along the direction of an arrow D12. In addition, the injection mold 9 has a narrowed runner 92 disposed in the direction of the arrow D12, such that the plastic lens barrel 12 correspondingly has a narrowed structure 120 after being formed.

The plastic lens barrel 12 surrounds the optical axis 11 and includes an object-side surface 121, an image-side surface 122, an inner annular portion 123 and an outer annular portion 124. The object-side surface 121 is substantially perpendicular to the optical axis 11. The image-side surface 122 is substantially perpendicular to the optical axis 11 and is disposed opposite to the object-side surface 121. The maximum outer diameter of the object-side surface 121 is smaller than that of the image-side surface 122.

The inner annular portion 123 is connected to the object-side surface 121 and the image-side surface 122 and is located therebetween. The inner annular portion 123 has nine inner parallel annular surfaces 1231 and a tip-end aperture 1232.

Each of the diameters L11 and L12 of two inner parallel annular surfaces 1231a and 1231b among the nine inner parallel annular surfaces 1231 is larger than mm. Specifically, the diameter L11 of the inner parallel annular surface 1231a is mm, and the diameter L12 of the inner parallel annular surface 1231b is 10 mm. The tip-end aperture 1232 is located closer to the object-side surface 121 than the inner parallel annular surfaces 1231.

The outer annular portion 124 is connected to the object-side surface 121 and the image-side surface 122 and is located therebetween. The outer annular portion 124 is located farther away from the optical axis 11 than the inner annular portion 123. The outer annular portion 124 has a first outer annular surface 1241, a second outer annular surface 1242, a third outer annular surface 1243, three gate traces 1244 and three planes 1245. The tip-end aperture 1232, the first outer annular surface 1241, the second outer annular surface 1242, the third outer annular surface 1243, the planes 1245, the gate traces 1244, the inner parallel annular surface 1231b and the inner parallel annular surface 1231a are respectively disposed in order from the object side to the image side.

The first outer annular surface 1241 is tapered off towards the object-side surface 121. Specifically, the first outer annular surface 1241 is a tapered truncated conical surface.

The positions of the gate traces 1244 are corresponding to the positions of the gates 91. Specifically, the gate traces 1244 are respectively disposed on the planes 1245 and are axisymmetric to the optical axis 11.

The appearances of the gate traces 1244 are corresponding to the shapes of the gates 91. Specifically, the appearance of each of the gate traces 1244 is a trapezoid. Each of the gate traces 1244 includes a cutting trace area 1244a, and the surface appearances of the cutting trace areas 1244a are distinct from that of the peripheral areas thereof on the planes 1245.

The imaging lens assembly 13 includes seven imaging lens elements 131, four light-blocking elements 132, a spacer 133 and a retainer 134. Specifically, the imaging lens assembly 13 includes, in order from the object side to the image side, a first lens element 131a, a second lens element 131b, a light-blocking element 132a, a third lens element 131c, a light-blocking element 132b, a fourth lens element 131d, a light-blocking element 132c, a fifth lens element 131e, a spacer 133, a sixth lens element 131f, a light-blocking element 132d, a seventh lens element 131g and a retainer 134.

The outer edges of the seven imaging lens elements 131 are respectively partially in physical contact and tightly fitted with seven of the inner parallel annular surfaces 1231 of the inner annular portion 123. Specifically, each of the seven of the inner parallel annular surfaces 1231 has the same diameter at periphery thereof as the diameter of each of the seven imaging lens elements 131, and both of them are coaxially assembled. For example, the outer diameter of the sixth lens element 131f and the diameter L12 of the inner parallel annular surface 1231b are the same, and both of them are 10 mm; the outer diameter of the seventh lens element 131g and the diameter L11 of the inner parallel annular surface 1231a are the same, and both of them are 10.58 mm.

For achieving the aforementioned tightly fitting, both of the mold shrinkage of the plastic lens barrel 12 and the mold shrinkage of the imaging lens elements 131 need to be smaller than 0.7%, such that the manufacturing tolerances of the imaging lens elements 131 and the inner parallel annular surfaces 1231 of the plastic lens barrel 12 are controlled within the range of 2 μm.

When an angle between the first outer annular surface 1241 and the optical axis 11 is α, the following condition is satisfied: α=21 [deg.].

When a distance in parallel with the optical axis 11 between the gate traces 1244 and the object-side surface 121 of the plastic lens barrel 12 is Lg, and a distance in parallel with the optical axis 11 between the image-side surface 122 and the object-side surface 121 of the plastic lens barrel 12 is Lb, the following condition is satisfied: Lg/Lb=0.61.

When the distance in parallel with the optical axis 11 between the image-side surface 122 and the object-side surface 121 of the plastic lens barrel 12 is Lb, the following condition is satisfied: Lb=6.97 [mm].

2nd Embodiment

Figure 11:
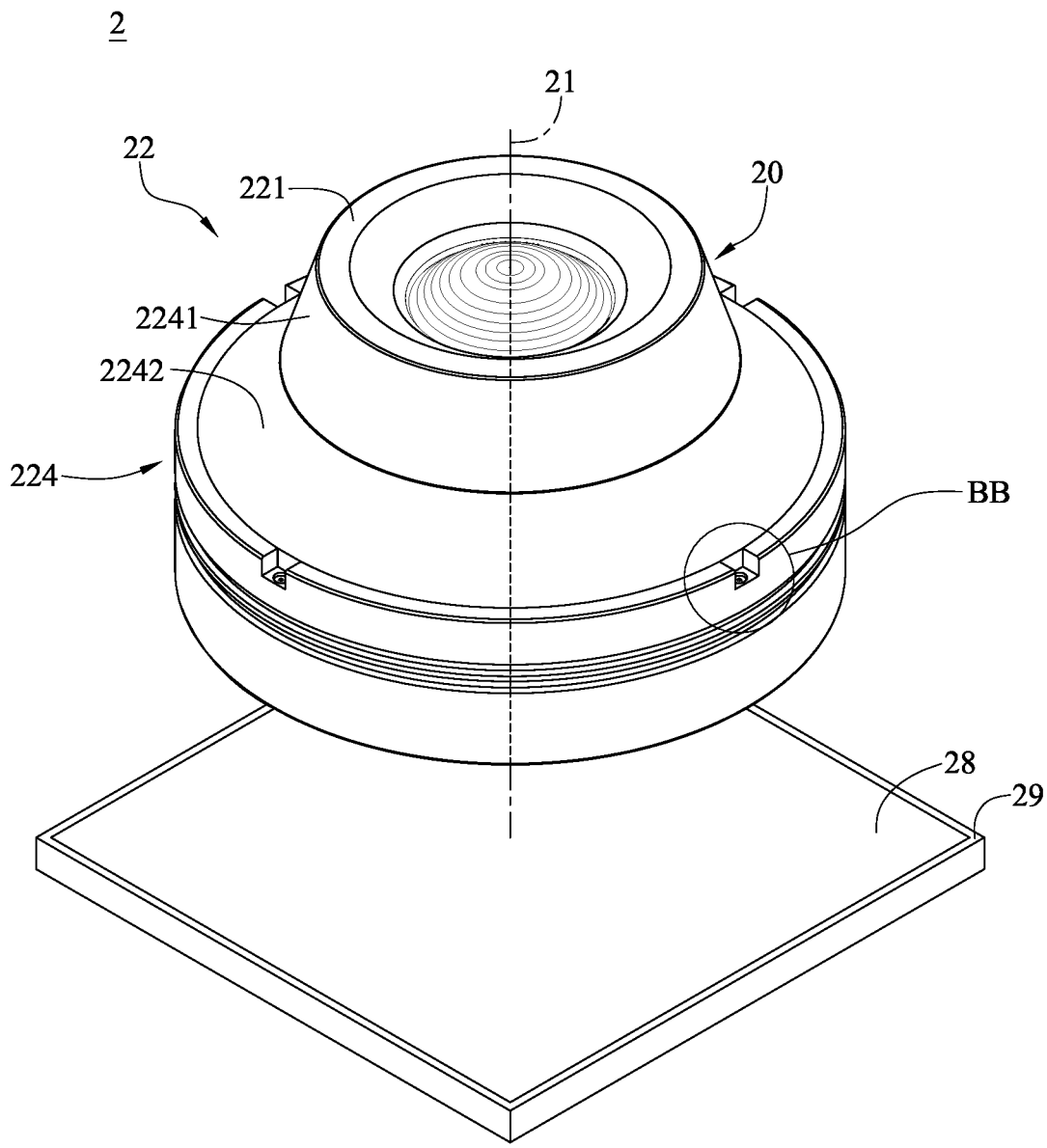
FIG. 11 is a perspective view of a camera module according to the 2nd embodiment of the present disclosure.
Figure 12:
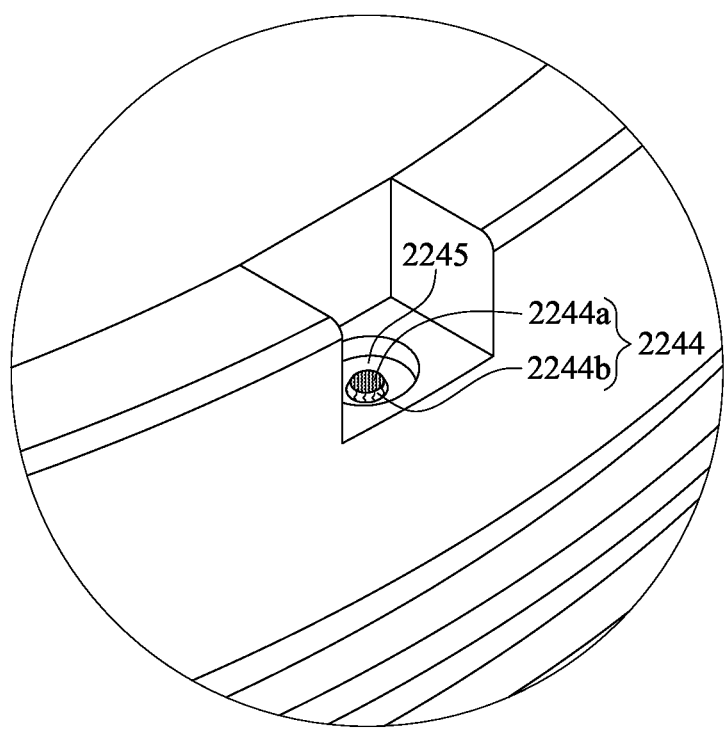
FIG. 12 is an enlarged view of the BB region of the camera module in FIG. 11.
Figure 13:
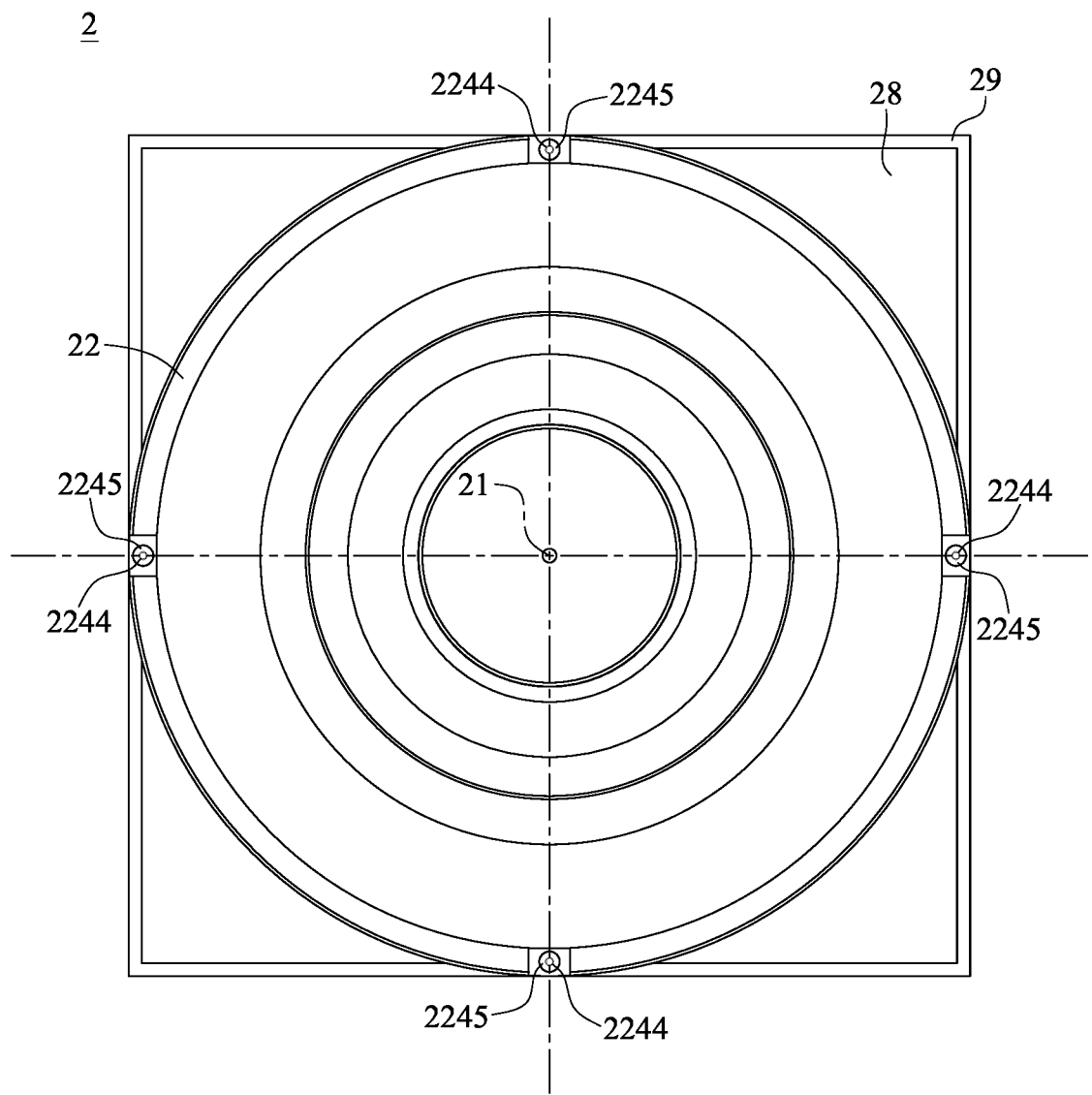
FIG. 13 is a top view of the camera module in FIG. 11.
Figure 14:
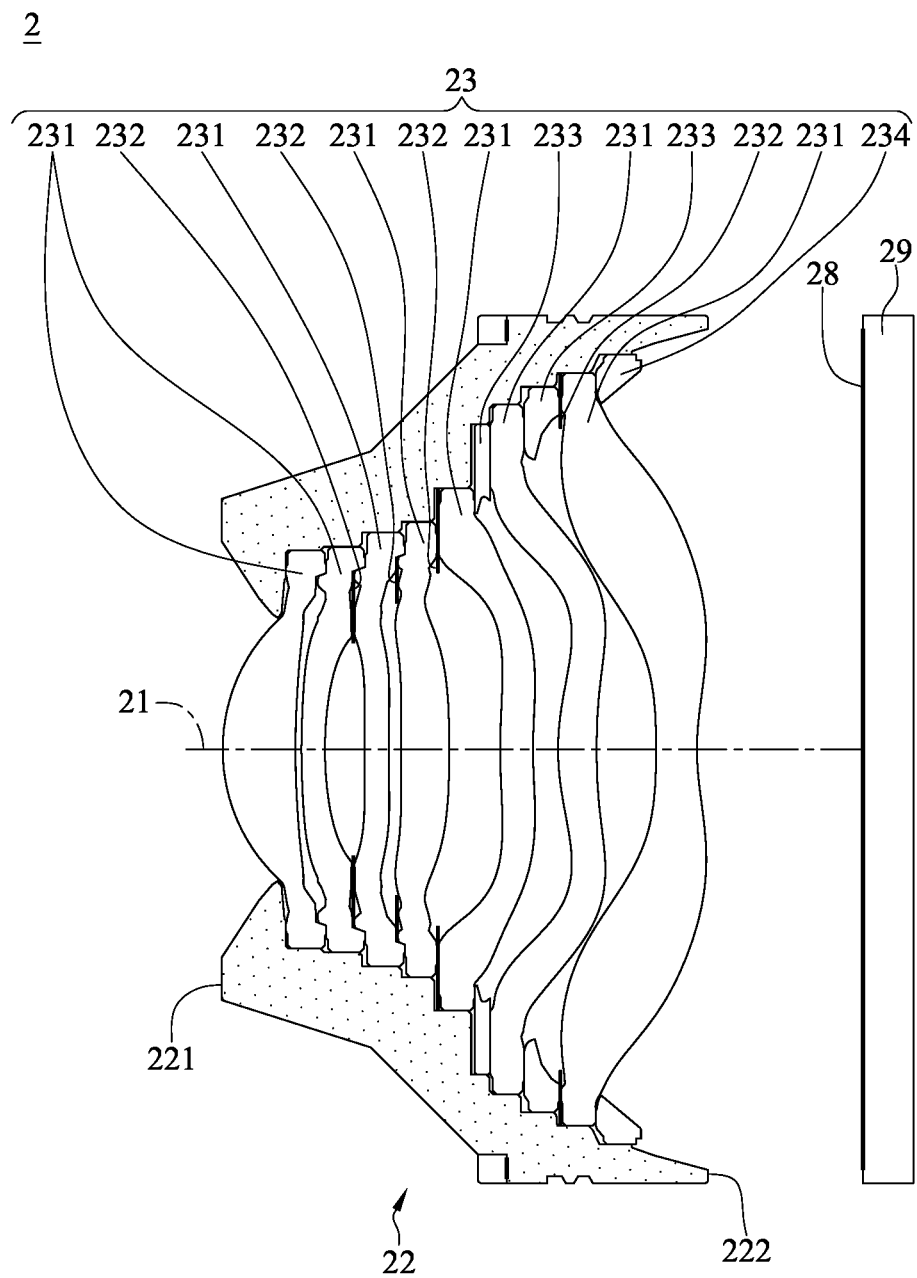
FIG. 14 is a cross-sectional view of the camera module in FIG. 11.
Figure 15:
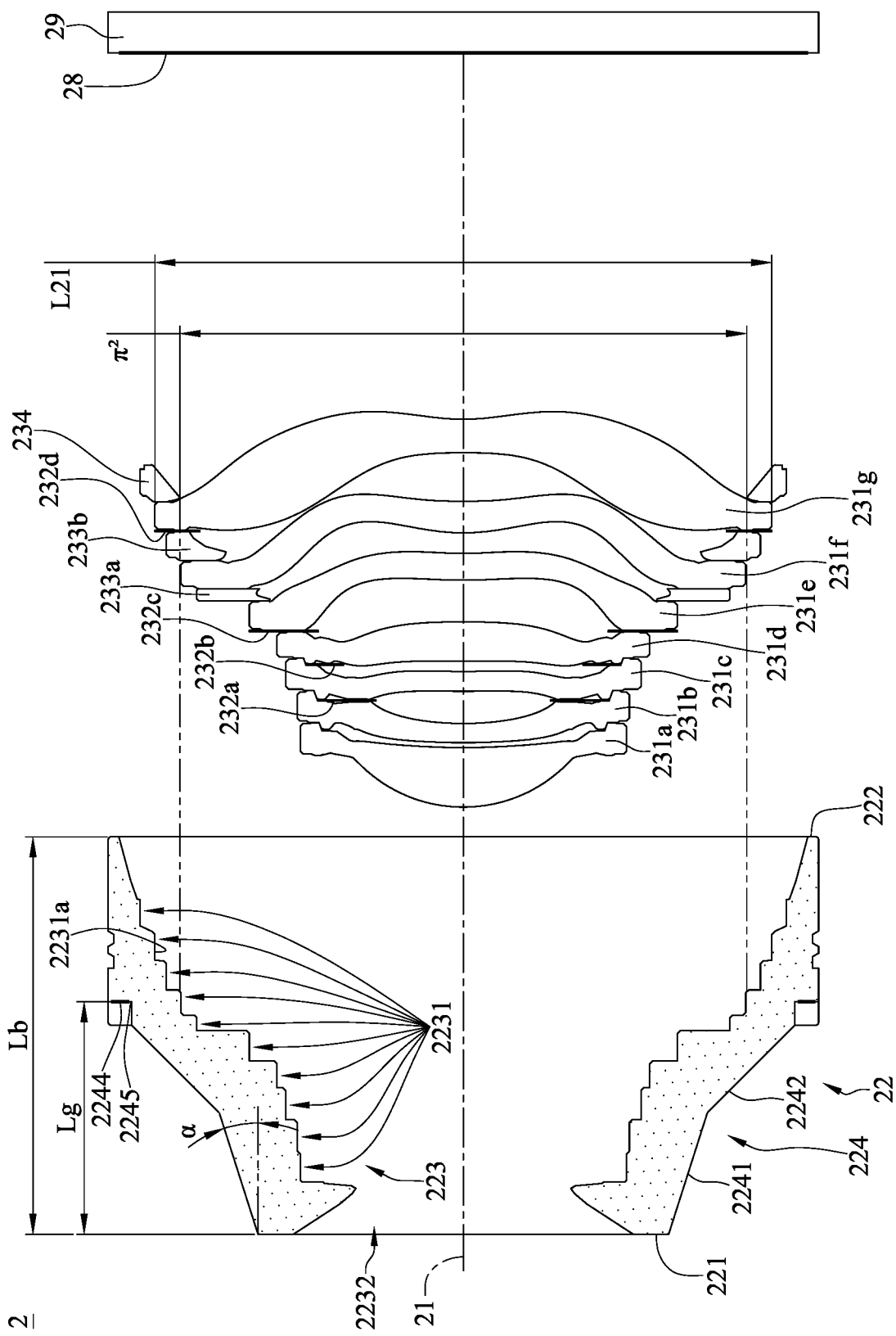
FIG. 15 is an exploded view of the camera module in FIG. 14.
Figure 16:
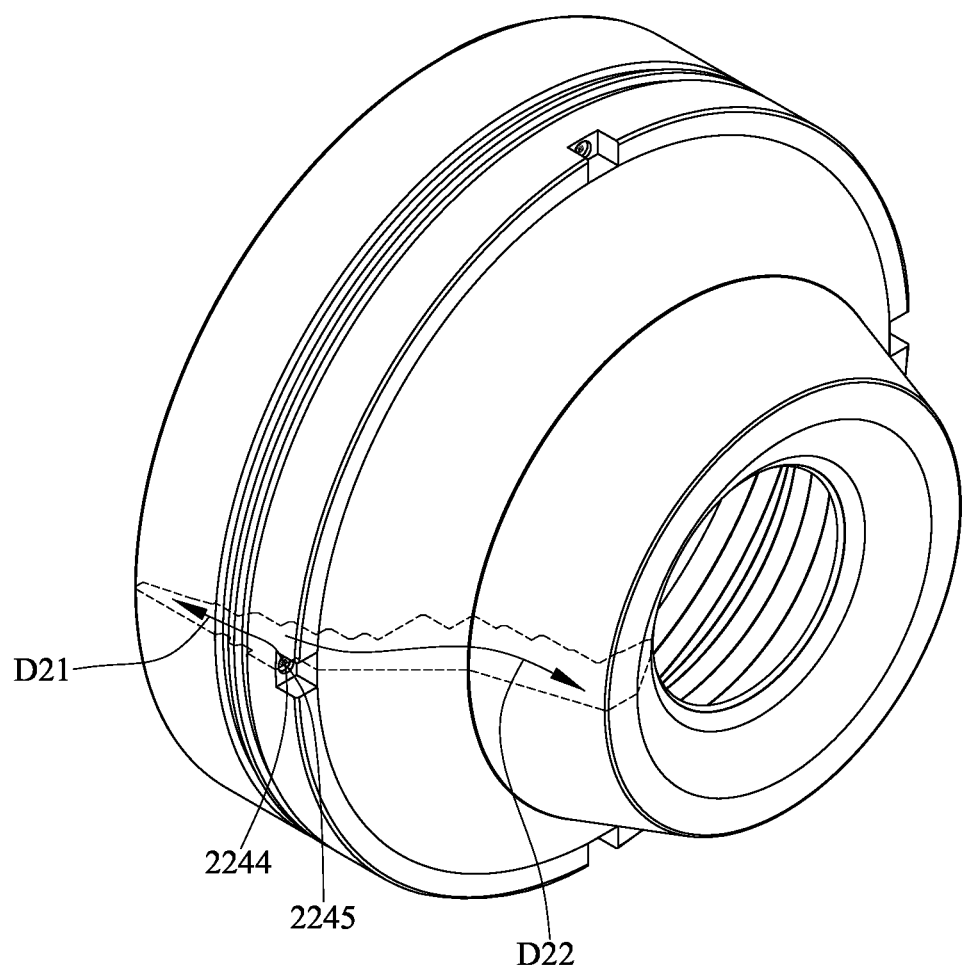
FIG. 16 is a perspective view of showing the plastic material flow direction during the formation of the plastic lens barrel of the camera module in FIG. 11 by injection molding.
Figure 17:
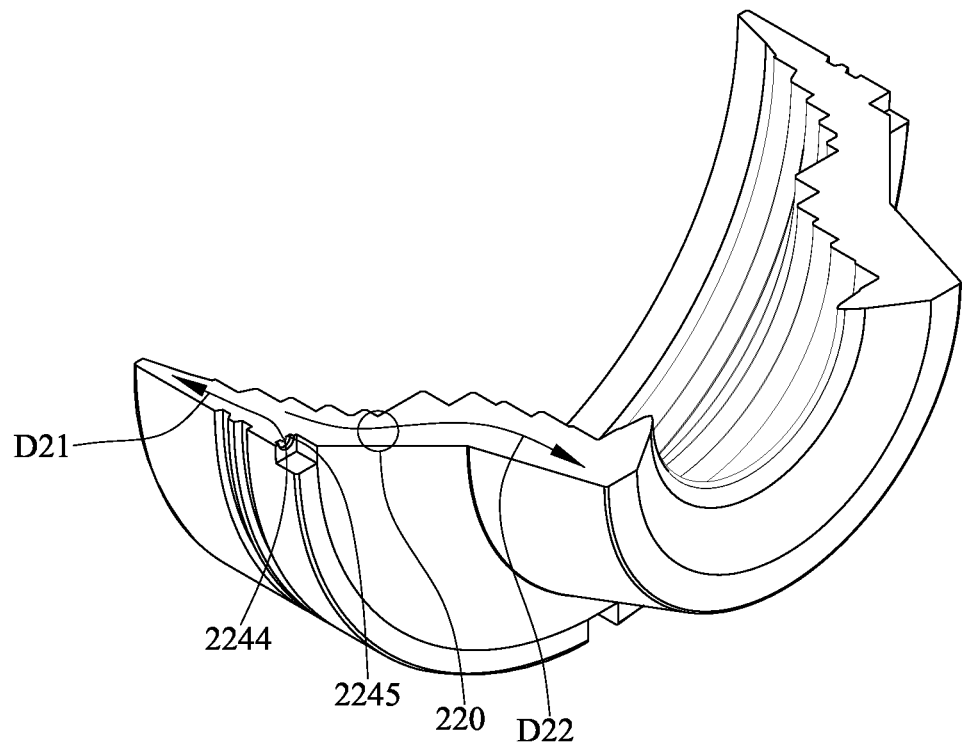
FIG. 17 is a perspective view of the sectioned plastic lens barrel in FIG. 16 for showing the plastic material flow direction during the formation.

Please refer to FIG. 11 to FIG. 17, where FIG. 11 is a perspective view of a camera module according to the 2nd embodiment of the present disclosure, FIG. 12 is an enlarged view of the BB region of the camera module in FIG. 11, FIG. 13 is a top view of the camera module in FIG. 11, FIG. 14 is a cross-sectional view of the camera module in FIG. 11, FIG. 15 is an exploded view of the camera module in FIG. 14, FIG. 16 is a perspective view of showing the plastic material flow direction during the formation of the plastic lens barrel of the camera module in FIG. 11 by injection molding, and FIG. 17 is a perspective view of the sectioned plastic lens barrel in FIG. 16 for showing the plastic material flow direction during the formation. Note that only the differences between this and the previous embodiments are illustrated hereinafter.

In this embodiment, a camera module 2 includes an imaging lens system 20 and an image sensor 29. The imaging lens system 20 has an optical axis 21 and an image surface 28, and the image sensor 29 is disposed on the image surface 28. The imaging lens system 20 includes a plastic lens barrel 22 and an imaging lens assembly 23. The plastic lens barrel 22 and the imaging lens assembly 23 both are located on an object-side direction of the image sensor 29, and the imaging lens assembly 23 is disposed in the plastic lens barrel 22.

The plastic lens barrel 22 is a non-threaded lens barrel made of black plastic material by injection molding and is fixed in a lens carrier (not shown) of the camera module 2 by engaging structures (not shown). In the injecting process of the injection molding, the plastic material in an injection mold is first filled towards an image side along the direction of an arrow D21, and then filled towards an object side along the direction of an arrow D22. In addition, the injection mold has a narrowed runner disposed in the direction of the arrow D22, such that the plastic lens barrel 22 correspondingly has a narrowed structure 220 after being formed.

The plastic lens barrel 22 surrounds the optical axis 21 and includes an object-side surface 221, an image-side surface 222, an inner annular portion 223 and an outer annular portion 224. The object-side surface 221 is substantially perpendicular to the optical axis 21. The image-side surface 222 is substantially perpendicular to the optical axis 21 and is disposed opposite to the object-side surface 221.

The maximum outer diameter of the object-side surface 221 is smaller than that of the image-side surface 222.

The inner annular portion 223 is connected to the object-side surface 221 and the image-side surface 222 and is located therebetween. The inner annular portion 223 has ten inner parallel annular surfaces 2231 and a tip-end aperture 2232.

The diameter L21 of one inner parallel annular surface 2231a among the ten inner parallel annular surfaces 2231 is larger than $\pi^2$ mm. Specifically, the diameter L21 of the inner parallel annular surface 2231a is 10.59 mm. The tip-end aperture 2232 is located closer to the object-side surface 221 than the inner parallel annular surfaces 2231.

The outer annular portion 224 is connected to the object-side surface 221 and the image-side surface 222 and is located therebetween. The outer annular portion 224 is located farther away from the optical axis 21 than the inner annular portion 223. The outer annular portion 224 has a first outer annular surface 2241, a second outer annular surface 2242, four gate traces 2244 and four planes 2245. The tip-end aperture 2232, the first outer annular surface 2241, the second outer annular surface 2242, the gate traces 2244, the planes 2245 and the inner parallel annular surface 2231a are respectively disposed in order from the object side to the image side.

The first outer annular surface 2241 is tapered off towards the object-side surface 221. Specifically, the first outer annular surface 2241 is a tapered truncated conical surface.

The gate traces 2244 are respectively disposed on the planes 2245 and are axisymmetric to the optical axis 21.

The appearance of each of the gate traces 2244 is a truncated cone. Each of the gate traces 2244 includes a cutting trace area 2244a and an injection defect area 2244b, and the surface appearances of the cutting trace areas 2244a and the injection defect area 2244b are distinct from that of the peripheral areas thereof on the planes 2245.

The imaging lens assembly 23 includes seven imaging lens elements 231, four light-blocking elements 232, two spacers 233 and a retainer 234. Specifically, the imaging lens assembly 23 includes, in order from the object side to the image side, a first lens element 231a, a second lens element 231b, a light-blocking element 232a, a third lens element 231c, a light-blocking element 232b, a fourth lens element 231d, a light-blocking element 232c, a fifth lens element 231e, a spacer 233a, a sixth lens element 231f, a spacer 233b, a light-blocking element 232d, a seventh lens element 231g and a retainer 234.

The outer edges of the seven imaging lens elements 231 are respectively partially in physical contact and tightly fitted with seven of the inner parallel annular surfaces 2231 of the inner annular portion 223. Specifically, each of the seven of the inner parallel annular surfaces 2231 has the same diameter at periphery thereof as the diameter of each of the seven imaging lens elements 231, and both of them are coaxially assembled. For example, the outer diameter of the seventh lens element 231g and the diameter L21 of the inner parallel annular surface 2231a are the same, and both of them are 10.59 mm.

For achieving the aforementioned tightly fitting, both of the mold shrinkage of the plastic lens barrel 22 and the mold shrinkage of the imaging lens elements 231 need to be smaller than 0.7%, such that the manufacturing tolerances of the imaging lens elements 231 and the inner parallel annular surfaces 2231 of the plastic lens barrel 22 are controlled within the range of 2 μm.

When an angle between the first outer annular surface 2241 and the optical axis 21 is α, the following condition is satisfied: α=18 [deg.].

When a distance in parallel with the optical axis 21 between the gate traces 2244 and the object-side surface 221 of the plastic lens barrel 22 is Lg, and a distance in parallel with the optical axis 21 between the image-side surface 222 and the object-side surface 221 of the plastic lens barrel 22 is Lb, the following condition is satisfied: Lg/Lb=0.59.

When the distance in parallel with the optical axis 21 between the image-side surface 222 and the object-side surface 221 of the plastic lens barrel 22 is Lb, the following condition is satisfied: Lb=6.83 [mm].

3rd Embodiment

Figure 18:
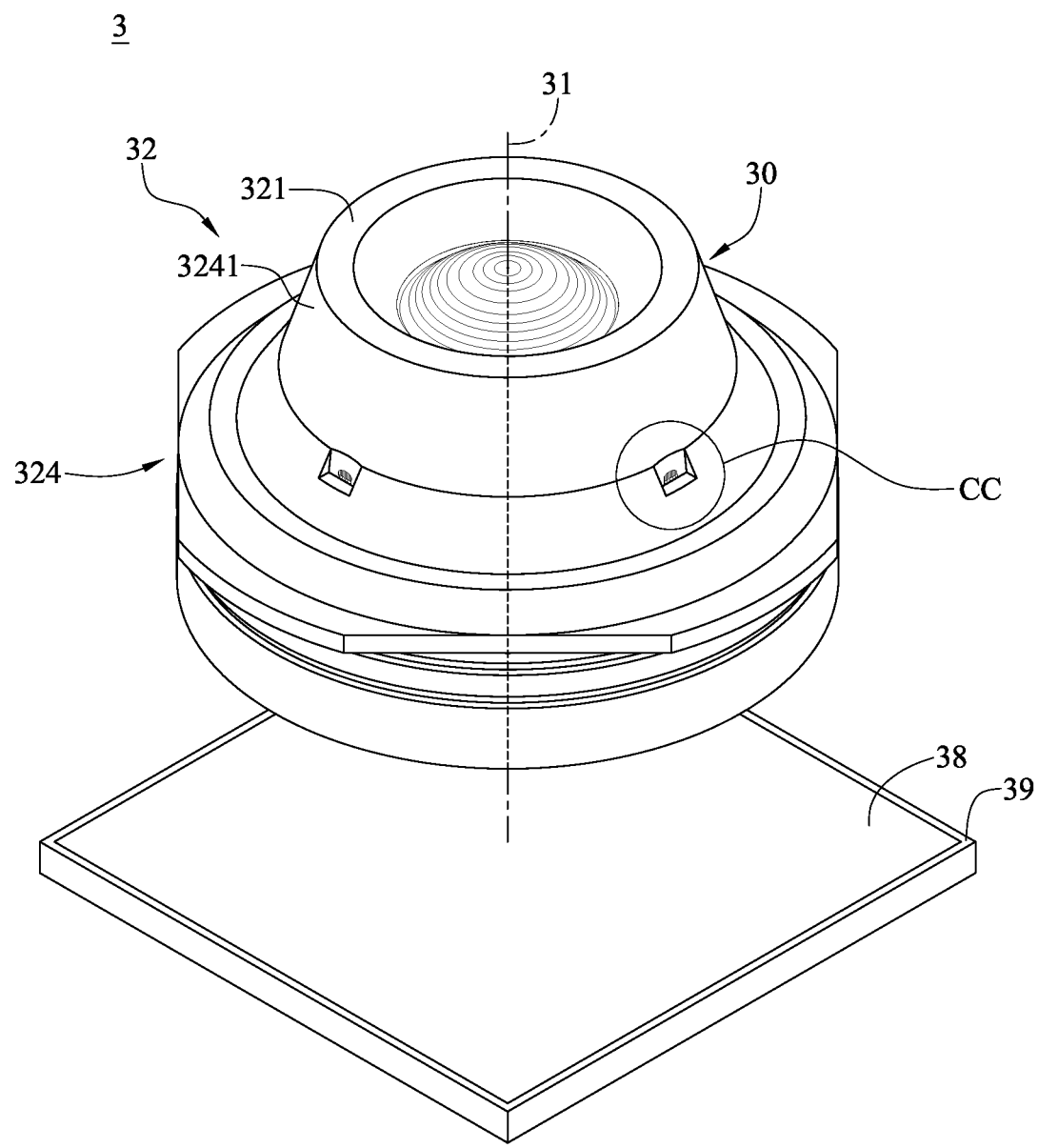
FIG. 18 is a perspective view of a camera module according to the 3rd embodiment of the present disclosure.
Figure 19:
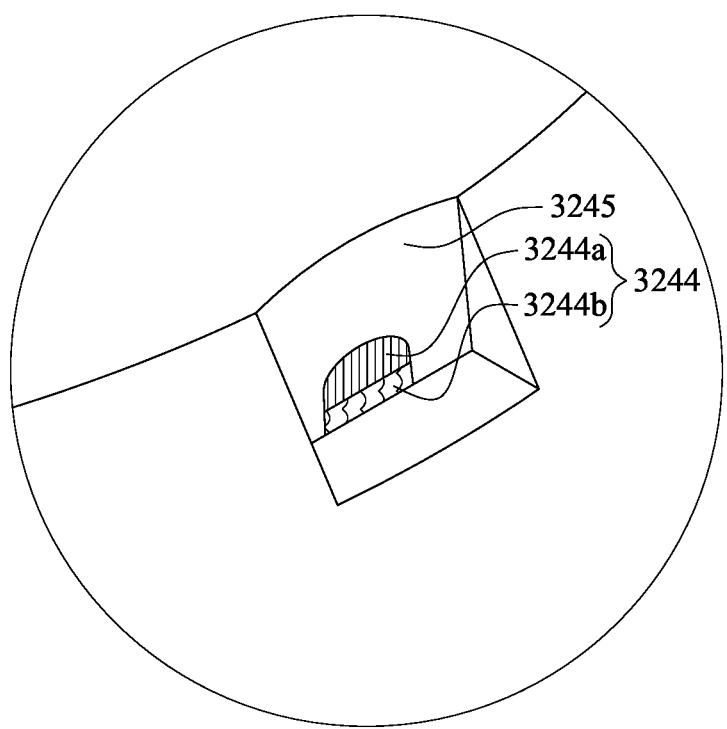
FIG. 19 is an enlarged view of the CC region of the camera module in FIG. 18.
Figure 20:
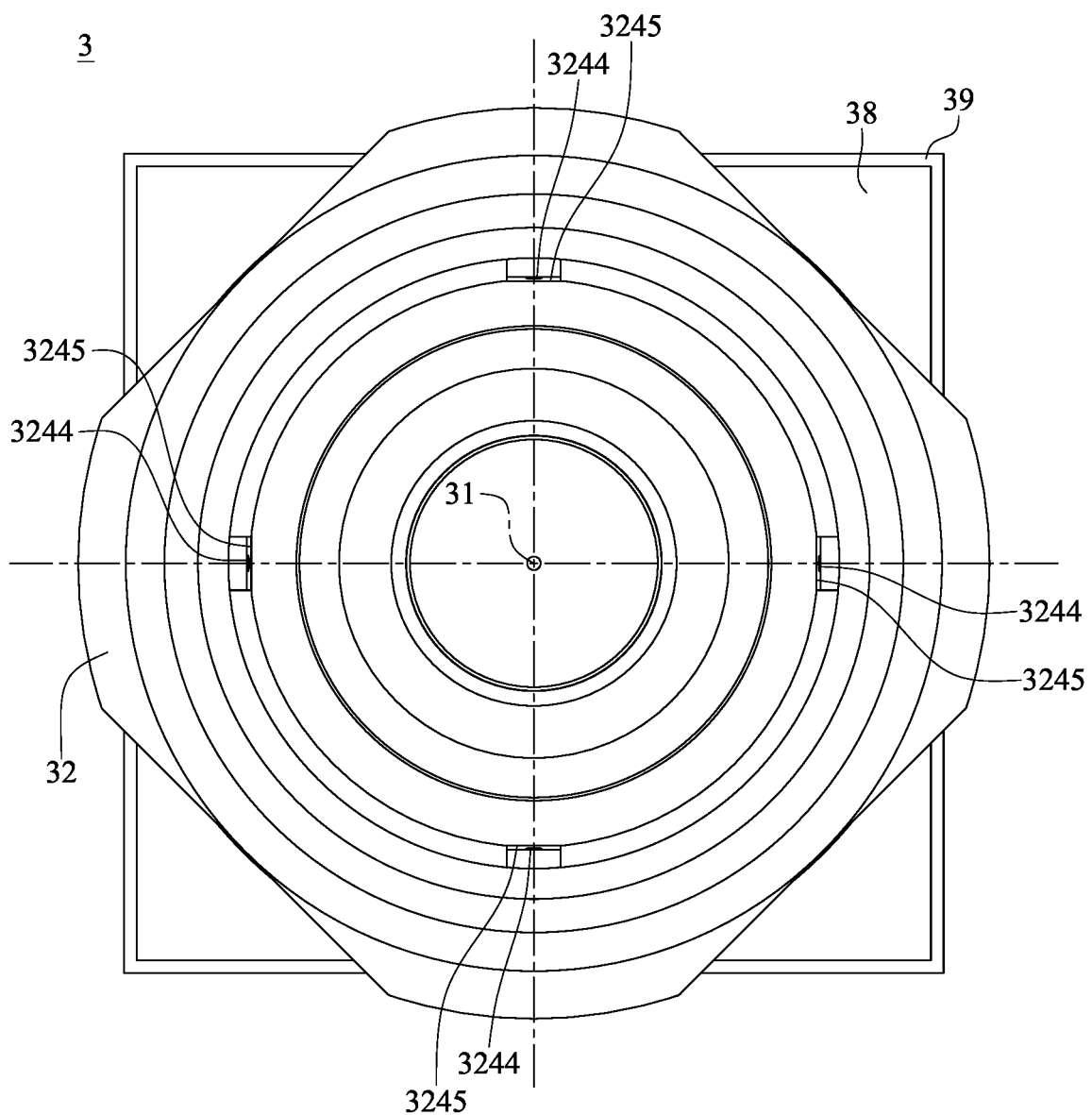
FIG. 20 is a top view of the camera module in FIG. 18.
Figure 21:
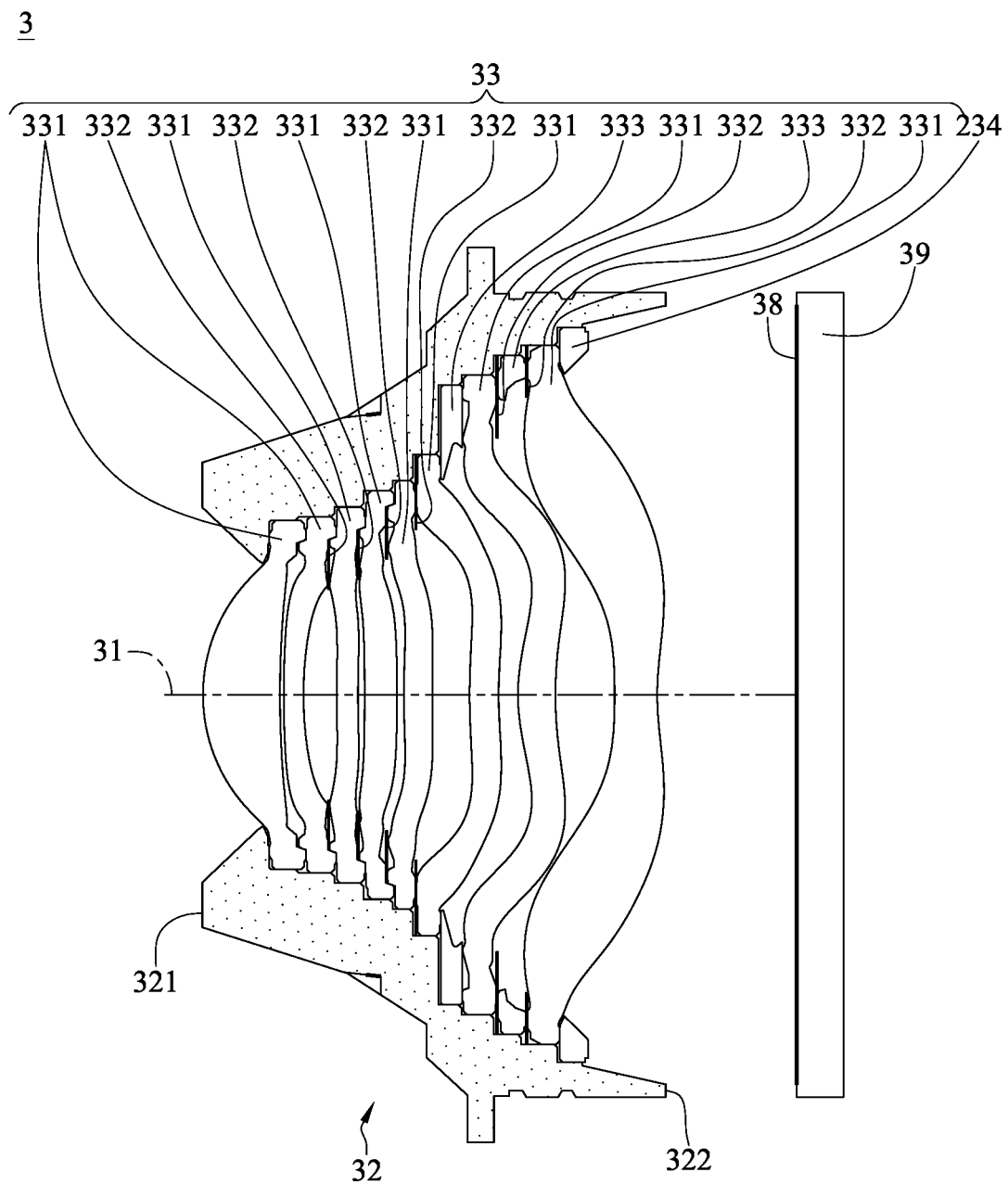
FIG. 21 is a cross-sectional view of the camera module in FIG. 18.
Figure 22:
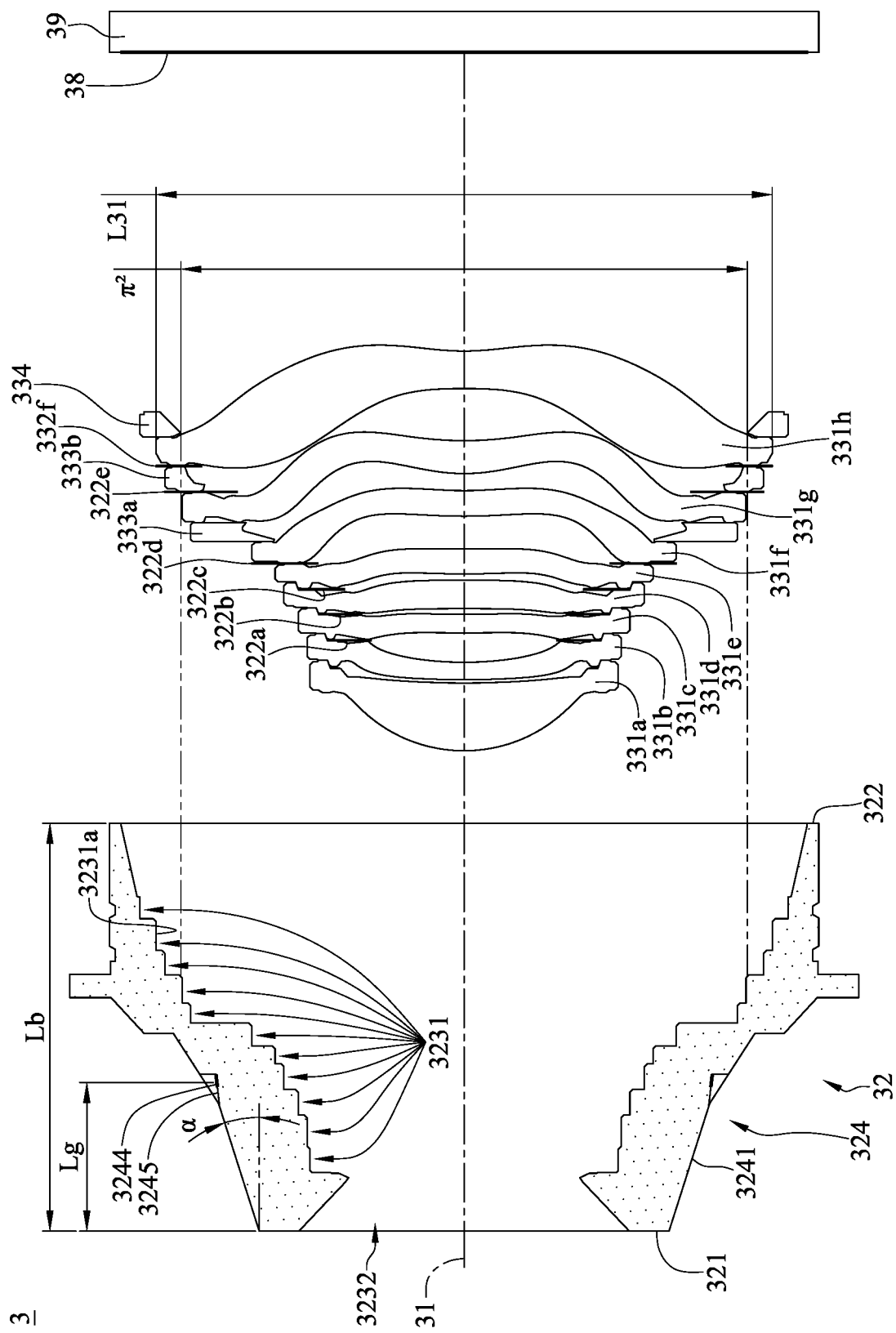
FIG. 22 is an exploded view of the camera module in FIG. 21.

Please refer to FIG. 18 to FIG. 24, where FIG. 18 is a perspective view of a camera module according to the 3rd embodiment of the present disclosure, FIG. 19 is an enlarged view of the CC region of the camera module in FIG. 18, FIG. 20 is a top view of the camera module in FIG. 18, FIG. 21 is a cross-sectional view of the camera module in FIG. 18, FIG. 22 is an exploded view of the camera module in FIG. 21, FIG. 23 is a perspective view of showing the plastic material flow direction during the formation of the plastic lens barrel of the camera module in FIG. 18 by injection molding, and FIG. 24 is a perspective view of the sectioned plastic lens barrel in FIG. 23 for showing the plastic material flow direction during the formation. Note that only the differences between this and the previous embodiments are illustrated hereinafter.

In this embodiment, a camera module 3 includes an imaging lens system 30 and an image sensor 39. The imaging lens system 30 has an optical axis 31 and an image surface 38, and the image sensor 39 is disposed on the image surface 38. The imaging lens system 30 includes a plastic lens barrel 32 and an imaging lens assembly 33. The plastic lens barrel 32 and the imaging lens assembly 33 both are located on an object-side direction of the image sensor 39, and the imaging lens assembly 33 is disposed in the plastic lens barrel 32.

The plastic lens barrel 32 is a non-threaded lens barrel made of black plastic material by injection molding and is fixed in a lens carrier (not shown) of the camera module 3 by adhesives. In the injecting process of the injection molding, the plastic material in an injection mold is first filled towards an object side along the direction of an arrow D31, and then filled towards an image side along the direction of an arrow D32. In addition, the injection mold has a narrowed runner disposed in the direction of the arrow D32, such that the plastic lens barrel 32 correspondingly has a narrowed structure 320 after being formed.

The plastic lens barrel 32 surrounds the optical axis 31 and includes an object-side surface 321, an image-side surface 322, an inner annular portion 323 and an outer annular portion 324. The object-side surface 321 is substantially perpendicular to the optical axis 31. The image-side surface 322 is substantially perpendicular to the optical axis 31 and is disposed opposite to the object-side surface 321. The maximum outer diameter of the object-side surface 321 is smaller than that of the image-side surface 322.

The inner annular portion 323 is connected to the object-side surface 321 and the image-side surface 322 and is located therebetween. The inner annular portion 323 has eleven inner parallel annular surfaces 3231 and a tip-end aperture 3232.

The diameter L31 of one inner parallel annular surface 3231a among the eleven inner parallel annular surfaces 3231 is larger than $\pi^2$ mm. Specifically, the diameter L31 of the inner parallel annular surface 3231a is 10.6 mm. The tip-end aperture 3232 is located closer to the object-side surface 321 than the inner parallel annular surfaces 3231.

The outer annular portion 324 is connected to the object-side surface 321 and the image-side surface 322 and is located therebetween. The outer annular portion 324 is located farther away from the optical axis 31 than the inner annular portion 323. The outer annular portion 324 has a first outer annular surface 3241, four gate traces 3244 and four planes 3245. The tip-end aperture 3232, the first outer annular surface 3241, the planes 3245, the gate traces 3244 and the inner parallel annular surface 3231a are respectively disposed in order from the object side to the image side.

The first outer annular surface 3241 is tapered off towards the object-side surface 321. Specifically, the first outer annular surface 3241 is a tapered truncated conical surface.

The gate traces 3244 are respectively disposed on the planes 3245 and are axisymmetric to the optical axis 31.

The appearance of each of the gate traces 3244 is a semi-oval. Each of the gate traces 3244 includes a cutting trace area 3244a and an injection defect area 3244b, and the surface appearances of the cutting trace areas 3244a and the injection defect area 3244b are distinct from that of the peripheral areas thereof on the planes 3245.

The imaging lens assembly 33 includes eight imaging lens elements 331, six light-blocking elements 332, two spacers 333 and a retainer 334. Specifically, the imaging lens assembly 33 includes, in order from the object side to the image side, a first lens element 331a, a second lens element 331b, a light-blocking element 332a, a third lens element 331c, a light-blocking element 332b, a fourth lens element 331d, a light-blocking element 332c, a fifth lens element 331e, a light-blocking element 332d, a sixth lens element 331f, a spacer 333a, a seventh lens element 331g, a light-blocking element 332e, a spacer 333b, a light-blocking element 332f, an eighth lens element 331h and a retainer 334.

The outer edges of the eight imaging lens elements 331 are respectively partially in physical contact and tightly fitted with eight of the inner parallel annular surfaces 3231 of the inner annular portion 323. Specifically, each of the eight of the inner parallel annular surfaces 3231 has the same diameter at periphery thereof as the diameter of each of the eight imaging lens elements 331, and both of them are coaxially assembled. For example, the outer diameter of the eighth lens element 331h and the diameter L31 of the inner parallel annular surface 3231a are the same, and both of them are 10.6 mm.

For achieving the aforementioned tightly fitting, both of the mold shrinkage of the plastic lens barrel 32 and the mold shrinkage of the imaging lens elements 331 need to be smaller than 0.7%, such that the manufacturing tolerances of the imaging lens elements 331 and the inner parallel annular surfaces 3231 of the plastic lens barrel 32 are controlled within the range of 2 μm.

When an angle between the first outer annular surface 3241 and the optical axis 31 is α, the following condition is satisfied: α=18 [deg.].

When a distance in parallel with the optical axis 31 between the gate traces 3244 and the object-side surface 321 of the plastic lens barrel 32 is Lg, and a distance in parallel with the optical axis 31 between the image-side surface 322 and the object-side surface 321 of the plastic lens barrel 32 is Lb, the following condition is satisfied: Lg/Lb=0.36.

When the distance in parallel with the optical axis 31 between the image-side surface 322 and the object-side surface 321 of the plastic lens barrel 32 is Lb, the following condition is satisfied: Lb=7.02 [mm].

4th Embodiment

Figure 25:
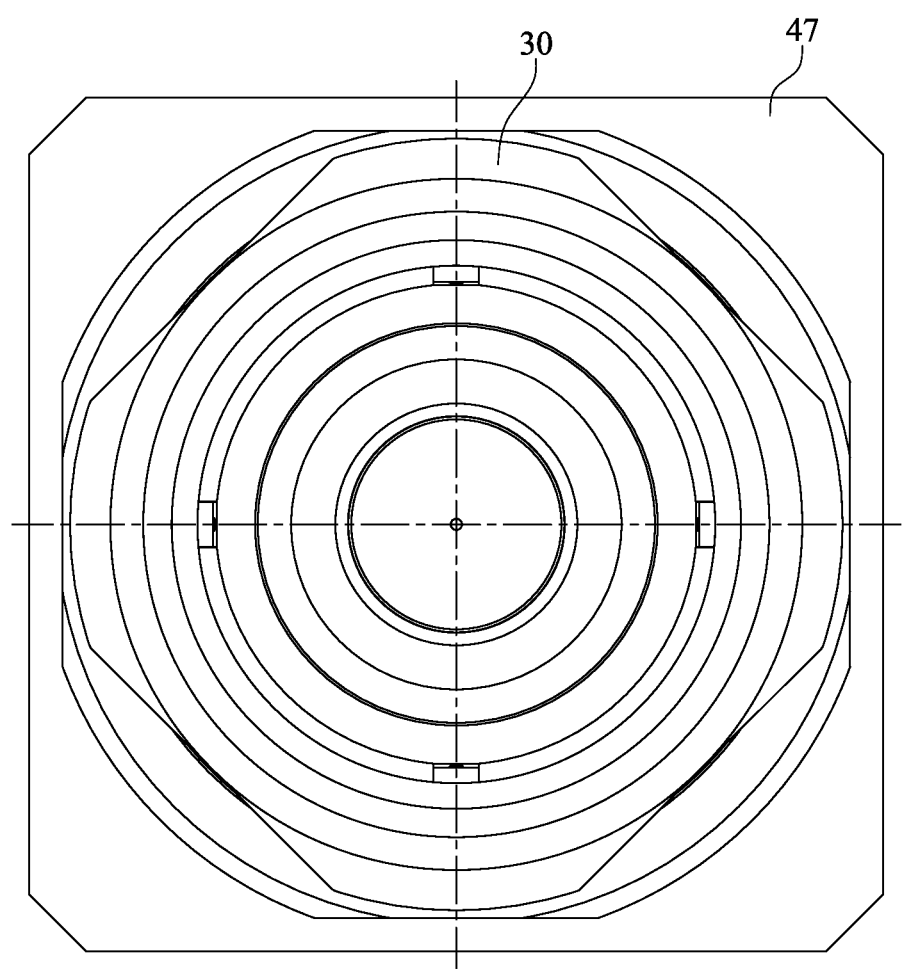
FIG. 25 is a top view of a camera module according to the 4th embodiment of the present disclosure.
Figure 26:
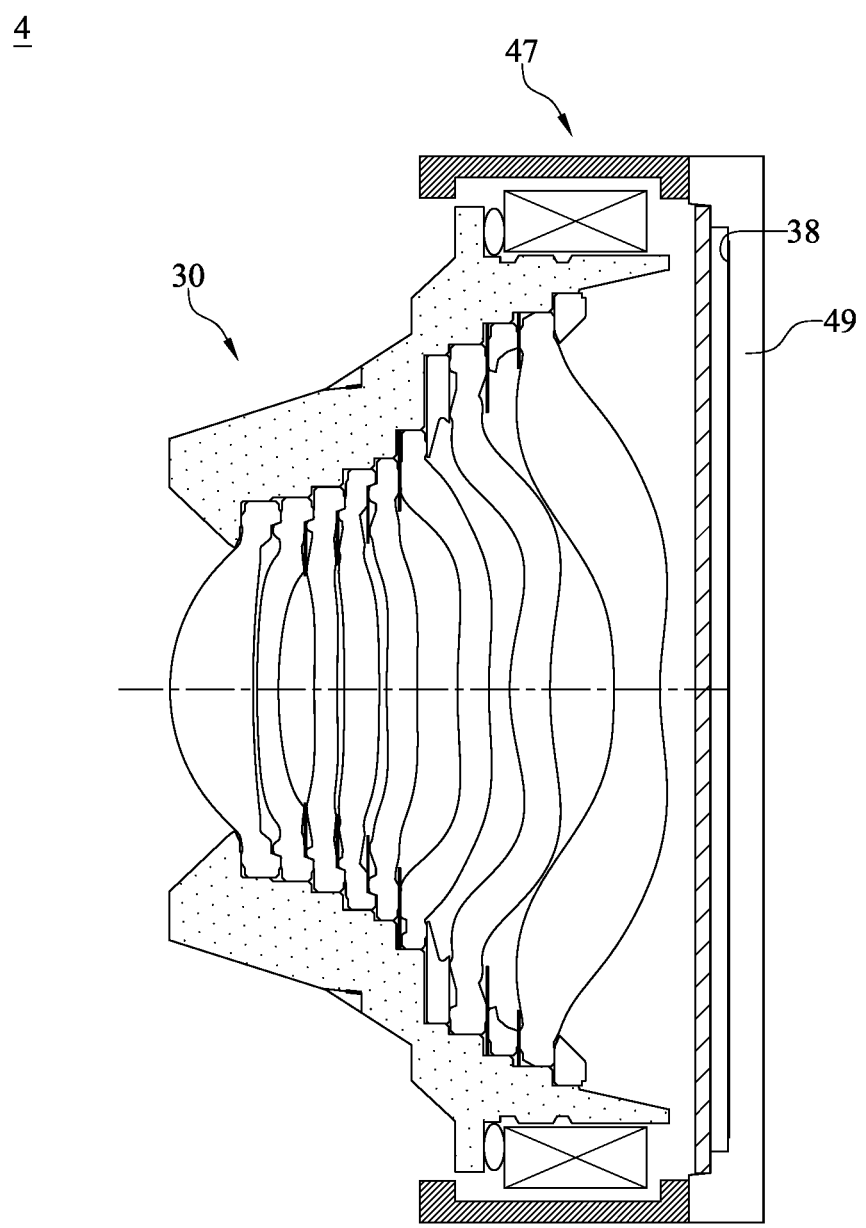
FIG. 26 is a cross-sectional view of the camera module in FIG. 25.

Please refer to FIG. 25 to FIG. 26, where FIG. 25 is a top view of a camera module according to the 4th embodiment of the present disclosure, and FIG. 26 is a cross-sectional view of the camera module in FIG. 25. Note that only the differences between this and the previous embodiments are illustrated hereinafter.

In this embodiment, a camera module 4 includes the imaging lens system 30 disclosed in the 3rd embodiment, a driving module 47 and an image sensor 49. The driving module 47 is disposed on the imaging lens system 30, and the image sensor 49 is disposed on the image surface 38.

5th Embodiment

Figure 27:
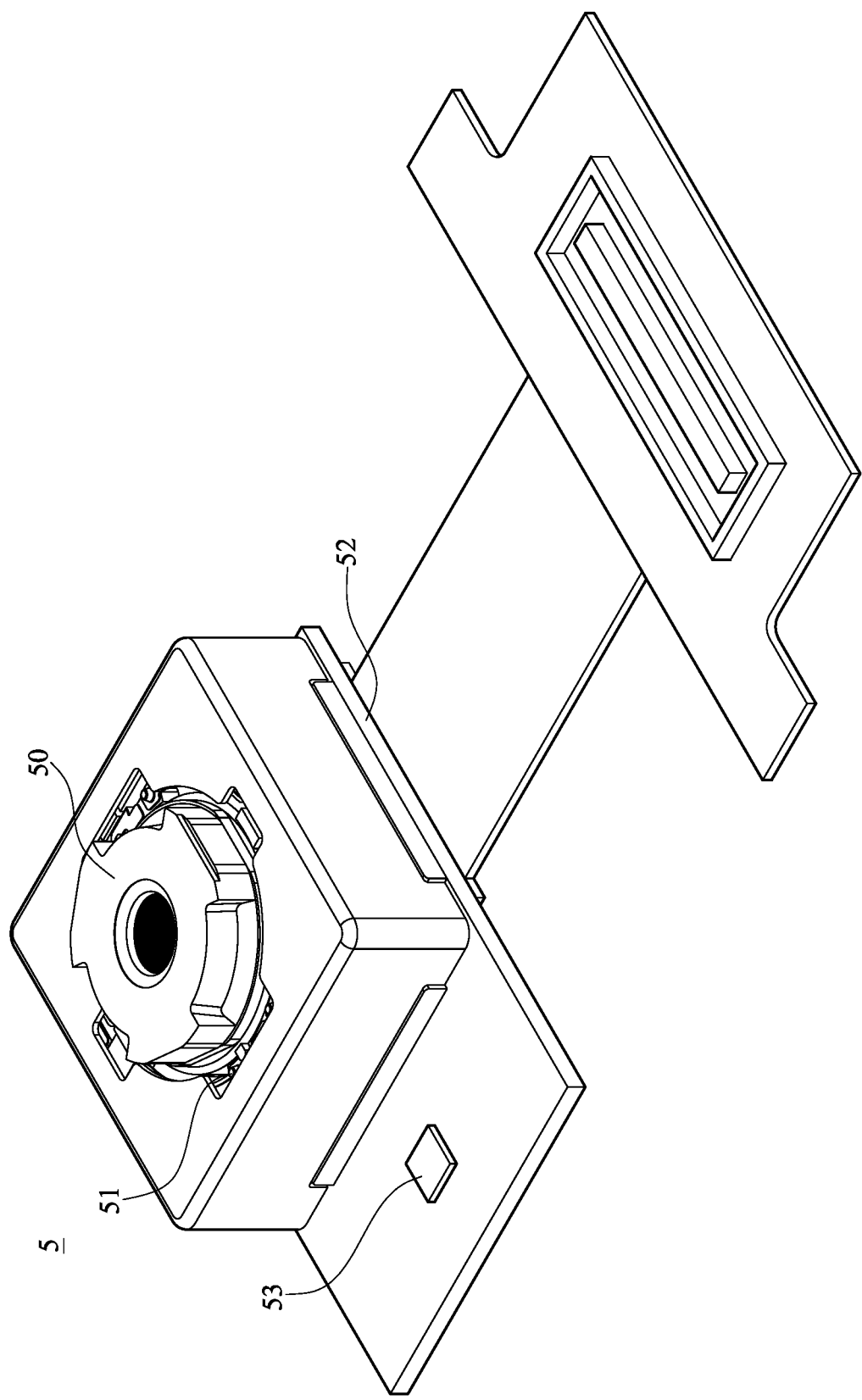
FIG. 27 is a perspective view of a camera module according to the 5th embodiment of the present disclosure.

Please refer to FIG. 27, which is a perspective view of a camera module according to the 5th embodiment of the present disclosure. In this embodiment, a camera module 5 includes an imaging lens system 50, a driving device 51, an image sensor 52 and an image stabilizer 53. The imaging lens system 50 is, for example, the same as the imaging lens system 10 disclosed in the 1st embodiment, and includes the plastic lens barrel 12 and a holder member (its reference numeral is omitted) for holding imaging lens assembly 13; the camera module 5 may include the imaging lens system disclosed in other embodiments, and the present disclosure is not limited thereto. The imaging light converges in the imaging lens system 50 of the camera module 5 to generate an image with the driving device 51 utilized for image focusing on the image sensor 52, and the generated image is then digitally transmitted to other electronic component for further processing.

The driving device 51 can have auto focusing functionality, and different driving configurations can be obtained through the usages of voice coil motors (VCM), micro electro-mechanical systems (MEMS), piezoelectric systems, or shape memory alloy materials. The driving device 51 is favorable for obtaining a better imaging position of the imaging lens system 50, so that a clear image of the imaged object can be captured by the imaging lens system 50 with different object distances. The image sensor 52 (for example, CCD or CMOS), which can feature high photosensitivity and low noise, is disposed on the image surface of the imaging lens system 50 to provide higher image quality.

The image stabilizer 53, such as an accelerometer, a gyro sensor and a Hall Effect sensor, is configured to work with the driving device 51 to provide optical image stabilization (OIS). The driving device 51 working with the image stabilizer 53 is favorable for compensating for pan and tilt of the imaging lens system 50 to reduce blurring associated with motion during exposure. In some cases, the compensation can be provided by electronic image stabilization (EIS) with image processing software, thereby improving image quality while in motion or low-light conditions.

6th Embodiment

Figure 28:
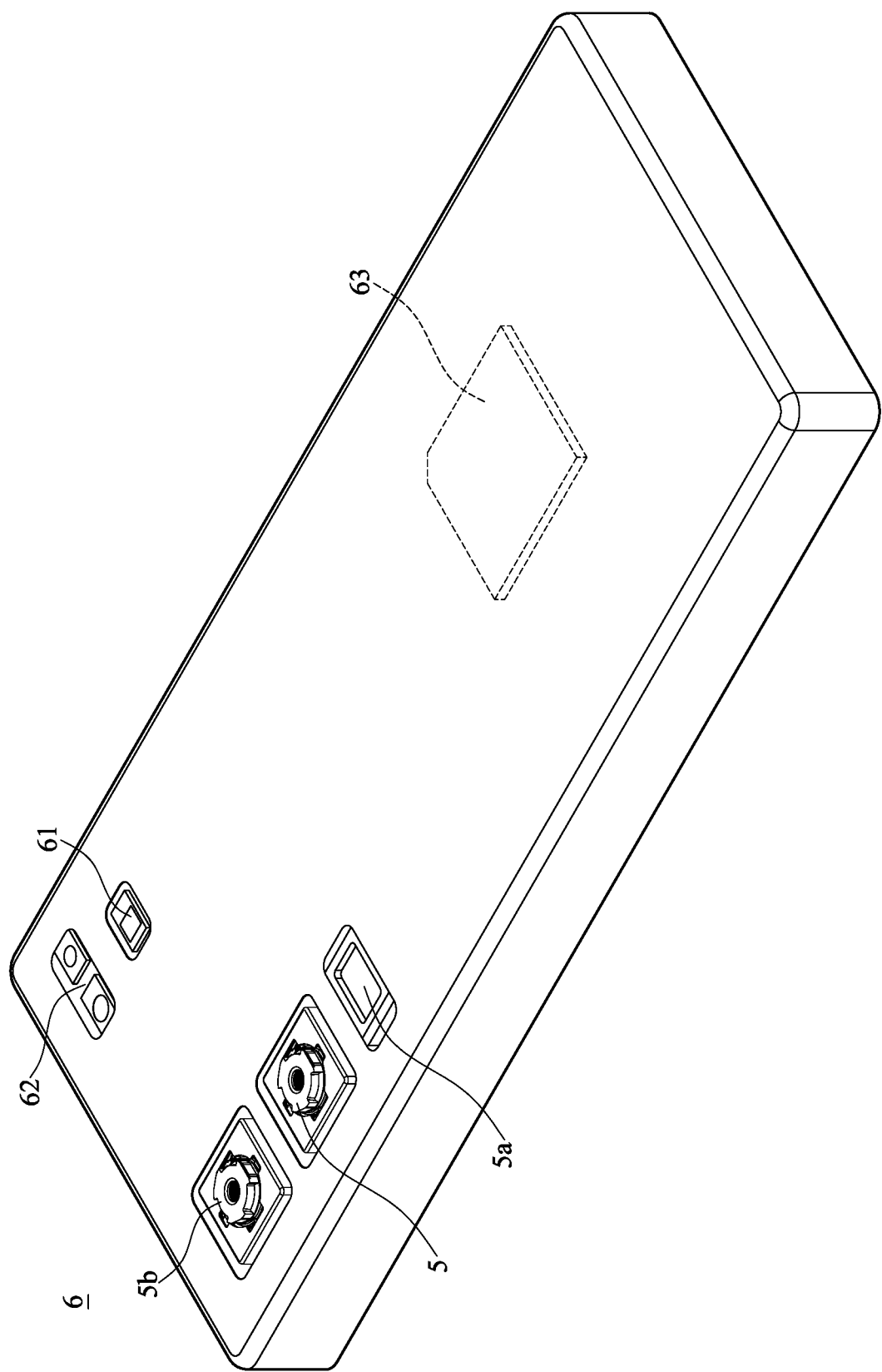
FIG. 28 is one perspective view of an electronic device according to the 6th embodiment of the present disclosure.
Figure 29:
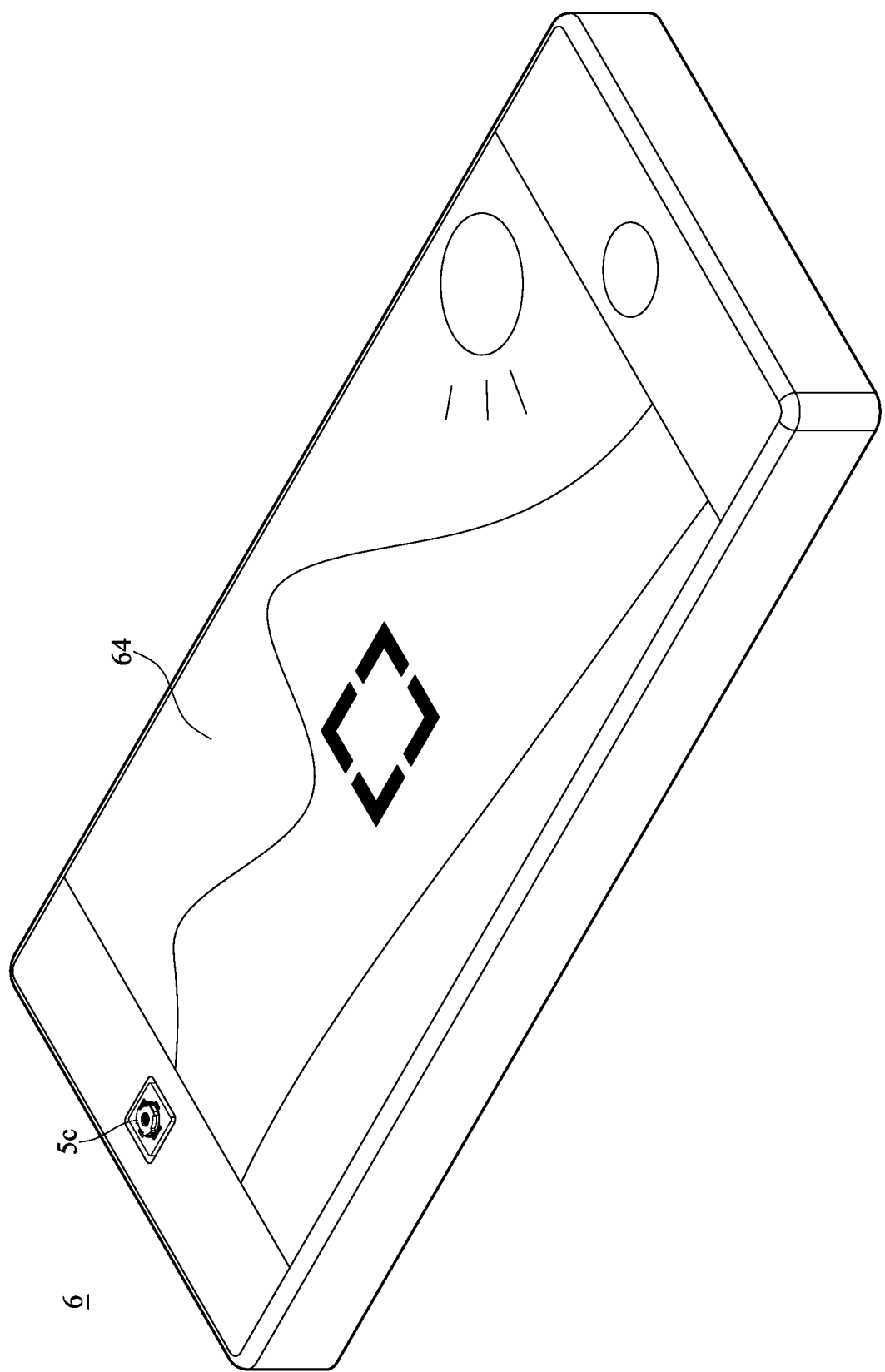
FIG. 29 is another perspective view of the electronic device in FIG. 28.
Figure 30:
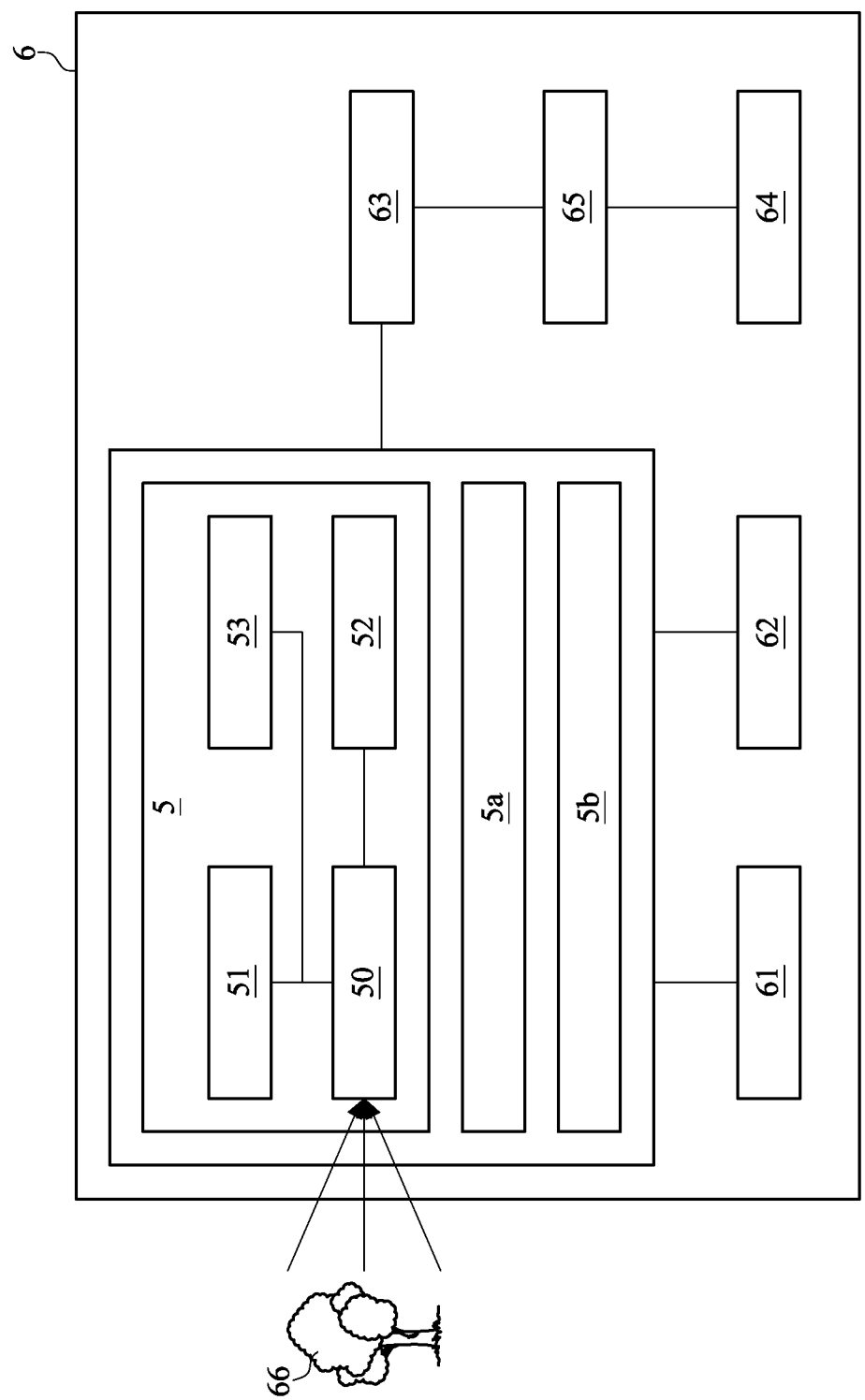
FIG. 30 is a block diagram of the electronic device in FIG. 28.

Please refer to FIG. 28 to FIG. 30, where FIG. 28 is one perspective view of an electronic device according to the 6th embodiment of the present disclosure, FIG. 29 is another perspective view of the electronic device in FIG. 28, and FIG. 30 is a block diagram of the electronic device in FIG. 28.

In this embodiment, an electronic device 6 is a smartphone including the camera module 5 disclosed in the 5th embodiment, a camera module 5a, a camera module 5b, a camera module 5c, a flash module 61, a focus assist module 62, an image signal processor 63, a user interface 64 and an image software processor 65. The camera module 5c is located on the same side as the user interface 64, and the camera module 5, the camera module 5a and the camera module 5b are located on the opposite side. The camera module 5, the camera module 5a and the camera module 5b all face the same direction, and each of the camera modules 5, 5a and has a single focal point. Furthermore, the camera module 5a, the camera module and the camera module 5c all have a configuration similar to that of the camera module 5. In detail, each of the camera module 5a, the camera module 5b and the camera module 5c includes an imaging lens system, a driving device, an image sensor and an image stabilizer, and the imaging lens system includes a lens assembly, a lens barrel and a holder member for holding the lens assembly.

In this embodiment, the camera modules 5, 5a and 5b have different fields of view (e.g., the camera module 5 is a standard image capturing unit, the camera module 5a is a telephoto image capturing unit, and the camera module 5b is a wide-angle image capturing unit), such that the electronic device 6 has various magnification ratios so as to meet the requirement of optical zoom functionality. In this embodiment, the electronic device 6 includes multiple camera modules 5, 5a, and 5c, but the present disclosure is not limited to the number and arrangement of camera modules.

When a user captures images of an object 66, the light rays converge in the camera module 5, the camera module 5a or the camera module 5b to generate an image(s), and the flash module 61 is activated for light supplement. The focus assist module 62 detects the object distance of the imaged object 66 to achieve fast auto focusing. The image signal processor 63 is configured to optimize the captured image to improve image quality. The light beam emitted from the focus assist module 62 can be either conventional infrared or laser. In addition, the electronic device 6 can capture images of the object 66 via the camera module 5c. The user interface 64 can be a touch screen or a physical button. The user is able to interact with the user interface 64 and the image software processor 65 having multiple functions to capture images and complete image processing. The image processed by the image software processor 65 can be displayed on the user interface 64.

This embodiment with smartphone is only exemplary for showing the imaging lens system of the present disclosure installed in an electronic device, and the present disclosure is not limited thereto. The imaging lens system can be optionally applied to optical systems with a movable focus. Furthermore, the imaging lens system features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens system, having an optical axis, and the imaging lens system comprising:
   a plastic lens barrel, made of black plastic material by injection molding, the plastic lens barrel surrounding the optical axis and comprising:
      an object-side surface, wherein the object-side surface is substantially perpendicular to the optical axis;
      an image-side surface, wherein the image-side surface is substantially perpendicular to the optical axis and is disposed opposite to the object-side surface;
      an inner annular portion, wherein the inner annular portion is connected to the object-side surface and the image-side surface, and the inner annular portion has at least one inner parallel annular surface having a diameter larger than $\pi^2$ millimeters, and $\pi$ is pi; and
      an outer annular portion, wherein the outer annular portion is connected to the object-side surface and the image-side surface, the outer annular portion is located farther away from the optical axis than the inner annular portion, and the outer annular portion has a first outer annular surface and at least three gate traces; and
   an imaging lens assembly, wherein the imaging lens assembly is disposed in the plastic lens barrel;
   wherein the first outer annular surface, the at least three gate traces and the at least one inner parallel annular surface are respectively disposed in order from an object side to an image side; and
   wherein the first outer annular surface is tapered off towards the object-side surface, an angle between the first outer annular surface and the optical axis is a, and the following condition is satisfied:

15 [deg.]≤α≤55 [deg.].

2. The imaging lens system of claim 1, wherein the at least three gate traces are axisymmetric to the optical axis.

3. The imaging lens system of claim 2, wherein the outer annular portion has at least three planes, and the at least three gate traces are respectively disposed on the at least three planes.

4. The imaging lens system of claim 1, wherein a maximum outer diameter of the object-side surface is smaller than a maximum outer diameter of the image-side surface.

5. The imaging lens system of claim 1, wherein the plastic lens barrel is a non-threaded lens barrel.

6. The imaging lens system of claim 1, wherein a distance in parallel with the optical axis between the image-side surface and the object-side surface of the plastic lens barrel is Lb, and the following condition is satisfied:

5 [mm]<Lb<15 [mm].

7. The imaging lens system of claim 1, wherein a distance in parallel with the optical axis between the at least three gate traces and the object-side surface of the plastic lens barrel is Lg, a distance in parallel with the optical axis between the image-side surface and the object-side surface of the plastic lens barrel is Lb, and the following condition is satisfied:

$$0.33 < Lg/Lb < 0.85.$$

8. The imaging lens system of claim 7, wherein the distance in parallel with the optical axis between the at least three gate traces and the object-side surface of the plastic lens barrel is Lg, the distance in parallel with the optical axis between the image-side surface and the object-side surface of the plastic lens barrel is Lb, and the following condition is satisfied:

$$0.5 \leq Lg/Lb \leq 0.75.$$

9. A camera module, comprising:
the imaging lens system of claim 1; and
an image sensor disposed on an image surface of the imaging lens system.

10. An electronic device, comprising:
the camera module of claim 9.

\* \* \* \* \*